United States Patent
Chen et al.

(10) Patent No.: US 9,923,206 B2
(45) Date of Patent: Mar. 20, 2018

(54) ENCAPSULATED PHTHALOCYANINE PARTICLES, HIGH-CAPACITY CATHODE CONTAINING THESE PARTICLES, AND RECHARGEABLE LITHIUM CELL CONTAINING SUCH A CATHODE

(75) Inventors: Guorong Chen, Fairborn, OH (US); Bor Z. Jang, Centerville, OH (US); Aruna Zhamu, Centerville, OH (US)

(73) Assignee: Nanotek Instruments, Inc., Dayton, OH (US)

(*) Notice: Subject to any disclaimer, the term of this patent is extended or adjusted under 35 U.S.C. 154(b) by 195 days.

(21) Appl. No.: 13/573,298

(22) Filed: Sep. 10, 2012

(65) Prior Publication Data

US 2014/0072879 A1    Mar. 13, 2014

(51) Int. Cl.
| | | |
|---|---|---|
| *H01M 4/60* | (2006.01) | |
| *H01M 10/0525* | (2010.01) | |
| *H01M 4/36* | (2006.01) | |
| *B82Y 30/00* | (2011.01) | |

(52) U.S. Cl.
CPC ............. *H01M 4/60* (2013.01); *H01M 4/366* (2013.01); *H01M 10/0525* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 4,251,607 A | 2/1981 | Yamaki et al. | |
| 4,838,074 A | 6/1989 | Morishita et al. | |
| 5,869,208 A * | 2/1999 | Miyasaka | 429/224 |
| 6,878,487 B2 * | 4/2005 | Cho et al. | 429/212 |
| 9,112,210 B2 | 8/2015 | Chen et al. | |
| 2001/0006749 A1 * | 7/2001 | Shackle | 429/212 |
| 2002/0102205 A1 * | 8/2002 | Amatucci | 423/598 |
| 2003/0027046 A1 * | 2/2003 | Hosokawa et al. | 429/223 |
| 2004/0265698 A1 * | 12/2004 | Takada | H01M 4/04 429/233 |
| 2005/0008935 A1 * | 1/2005 | Skotheim et al. | 429/218.1 |
| 2008/0279756 A1 | 11/2008 | Zhamu et al. | |
| 2009/0117466 A1 * | 5/2009 | Zhamu et al. | 429/231.8 |

(Continued)

FOREIGN PATENT DOCUMENTS

CN    101507930 A    8/2009

OTHER PUBLICATIONS

U.S. Appl. No. 11/800,728, filed May 8, 2007, A. Zhamu, et al.

(Continued)

*Primary Examiner* — Ula C Ruddock
*Assistant Examiner* — Tony S Chuo

(57) ABSTRACT

Disclosed is an electrode material comprising a phthalocyanine compound encapsulated by a protective material, preferably in a core-shell structure with a phthalocyanine compound core and a protective material shell. Also disclosed is a rechargeable lithium cell comprising: (a) an anode; (b) a cathode comprising an encapsulated or protected phthalocyanine compound as a cathode active material; and (c) a porous separator disposed between the anode and the cathode and/or an electrolyte in ionic contact with the anode and the cathode. This secondary cell exhibits a long cycle life, the best cathode specific capacity, and best cell-level specific energy of all rechargeable lithium-ion cells ever reported.

18 Claims, 10 Drawing Sheets

(56) References Cited

U.S. PATENT DOCUMENTS

| | | | |
|---|---|---|---|
| 2010/0173198 A1* | 7/2010 | Zhamu | H01M 4/134 429/222 |
| 2010/0297502 A1* | 11/2010 | Zhu | H01M 4/134 429/231.8 |
| 2011/0076560 A1 | 3/2011 | Scordilis-Kelley et al. | |
| 2011/0129729 A1* | 6/2011 | Kim | H01M 4/133 429/209 |
| 2012/0058397 A1* | 3/2012 | Zhamu et al. | 429/231.8 |
| 2013/0309561 A1* | 11/2013 | Chen | B82Y 30/00 429/188 |
| 2013/0330611 A1 | 12/2013 | Chen et al. | |
| 2014/0072871 A1 | 3/2014 | Chen et al. | |

OTHER PUBLICATIONS

U.S. Appl. No. 13/506,778, filed May 17, 2012, G. Chen, et al.
U.S. Appl. No. 13/507,168, filed Jun. 11, 2012, G. Chen, et al.
J. Yamaki and A. Yamaji, "Phthalocyanine cathode materials for secondary lithium cells," Electrochemical Society Journal, vol. 129, Jan. 1982, p. 5-9.
U.S. Appl. No. 13/506,778, Office Action dated Nov. 4, 2014, 10 pages.
U.S. Appl. No. 13/507,168, Office Action dated Oct. 6, 2014, 8 pages.
U.S. Appl. No. 13/573,275, Advisory Action dated Feb. 19, 2016, 3 pages.
U.S. Appl. No. 13/573,275, Office Action dated Jul. 15, 2015, 15 pages.
U.S. Appl. No. 13/573,275, Office Action dated Oct. 2, 2015, 9 pages.
English language translation of CN101507930 from EPO "http://translationportal.epo.org/emtp/translate/?ACTION=claims-retrieval&COUNTRY=C" 11 pages.
Ohta et al., "Hydrodeoxygenation of phenols as lignin models under acid-free conditions with carbon-supported platinum catalysts" OHElectronic Supplementary Material (ESI) for Chemical Communications—The Royal Society of Chemistry (2011) pp. S1-S7.
Schulte et al., "Assembly of Cobalt Phthalocyanine Stacks inside Carbon Nanotubes" Advanced Materials (2007) vol. 19, pp. 3312-3316.
Yamaki et al., "Phthalocyanine cathode materials for secondary lithium cells" Electrochemical Society Journal (1982) vol. 129, pp. 5-9.

* cited by examiner

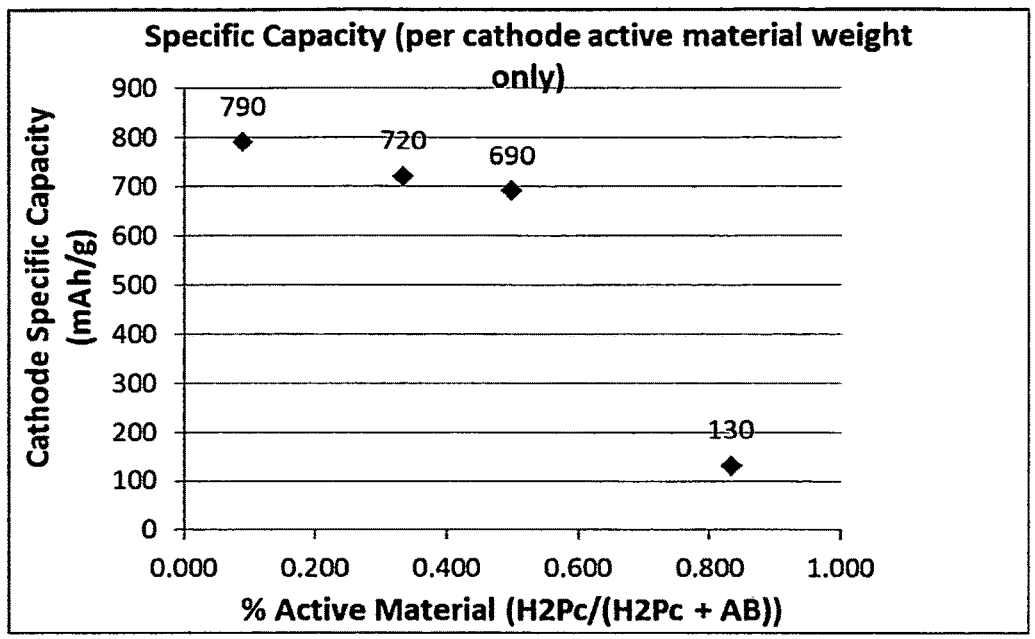
FIG. 1(A) Prior art (Yamaki, et al.)
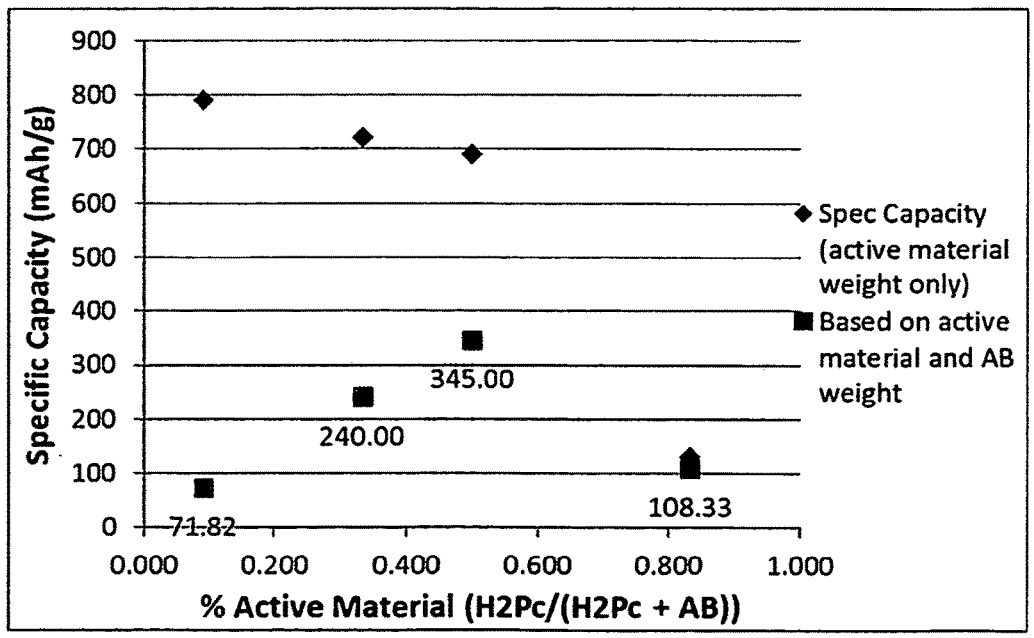
FIG. 1(B) Prior art (Yamaki, et al.)

ENCAPSULATED PHTHALOCYANINE PARTICLES, HIGH-CAPACITY CATHODE CONTAINING THESE PARTICLES, AND RECHARGEABLE LITHIUM CELL CONTAINING SUCH A CATHODE

This application claims the benefits of the following three co-pending applications:
1) Guorong Chen, Yanbo Wang, Aruna Zhamu, and Bor Z. Jang, "Rechargeable Lithium Cell Having a Phthalocyanine-Based High-Capacity Cathode," U.S. patent application Ser. No. 13/506,778 (May 17, 2012).
2) Guorong Chen, Yanbo Wang, Aruna Zhamu, and Bor Z. Jang, "Rechargeable Lithium Cell Having a Meso-Porous Conductive Material Structure-Supported Phthalocyanine Compound Cathode," U.S. patent application Ser. No. 13/507,168 (Jun. 11, 2012).
3) Guorong Chen, Zhenning Yu, Chen-guang Liu, Aruna Zhamu, and Bor Z. Jang, "Rechargeable Lithium Cell Having a Chemically Bonded Phthalocyanine Compound Cathode," US patent application submitted on Sep. 7, 2012.

FIELD OF THE INVENTION

This invention relates generally to the field of rechargeable (secondary) lithium metal or lithium-ion batteries and, more particularly, to a rechargeable lithium metal or lithium-ion cell having a phthalocyanine-based high-capacity cathode.

BACKGROUND OF THE INVENTION

Historically, today's most favorite rechargeable energy storage devices—lithium-ion batteries—actually evolved from rechargeable "lithium metal batteries" using lithium (Li) metal as the anode and a Li intercalation compound as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications. During the mid-1980s, several prototypes of rechargeable Li metal batteries were developed. A notable example was a battery composed of a Li metal anode and a molybdenum sulfide cathode, developed by MOLI Energy, Inc. (Canada). This and several other batteries from different manufacturers were abandoned due to a series of safety problems caused by sharply uneven Li growth (formation of Li dendrites) as the metal was re-plated during each subsequent recharge cycle. As the number of cycles increases, these dendritic or free-like Li structures could eventually traverse the separator to reach the cathode, causing internal short-circuiting.

To overcome these safety issues, several alternative approaches were proposed in which either the electrolyte or the anode was modified. The first approach involved replacing Li metal by graphite (another Li insertion material) as the anode. The operation of such a battery involves shuttling Li ions between two Li insertion compounds, hence the name "Li-ion battery. Presumably because of the presence of Li in its ionic rather than metallic state, Li-ion batteries are inherently safer than Li-metal batteries. The second approach entailed replacing the liquid electrolyte by a dry polymer electrolyte, leading to the Li solid polymer electrolyte (Li-SPE) batteries. However, Li-SPE has seen very limited applications since it typically requires an operating temperature of up to 80° C.

The past two decades have witnessed a continuous improvement in Li-ion batteries in terms of energy density, rate capability, and safety, and somehow the significantly higher energy density Li metal batteries have been largely overlooked. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density<<1 kW/kg), and necessity to use pre-lithiated cathodes (e.g. lithium cobalt oxide), thereby limiting the choice of available cathode materials. Further, these commonly used cathodes have a relatively low specific capacity (typically<200 mAh/g). These factors have contributed to the two major shortcomings of today's Li-ion batteries—a low energy density (typically 150-180 $Wh/kg_{cell}$) and low power density (typically<0.5 kW/kg).

Although several high-capacity anode active materials have been found (e.g., Si with a theoretical capacity of 4,200 mAh/g), there has been no corresponding high-capacity cathode material available. To sum it up, battery scientists have been frustrated with the low energy density of lithium-ion cells for over three decades!

Current cathode active materials commonly used in Li-ion batteries have the following serious drawbacks:

(1) The practical capacity achievable with current cathode materials (e.g. lithium iron phosphate and lithium transition metal oxides) has been limited to the range of 150-250 mAh/g and, in most cases, less than 200 mAh/g.

(2) The production of these cathode active materials normally has to go through a high-temperature sintering procedure for a long duration of time, a tedious, energy-intensive, and difficult-to-control process.

(3) The insertion and extraction of lithium in and out of these commonly used cathodes rely upon extremely slow solid-state diffusion of Li in solid particles having very low diffusion coefficients (typically $10^{-8}$ to $10^{-14}$ $cm^2/s$), leading to a very low power density (another long-standing problem of today's lithium-ion batteries).

(4) The current cathode materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium battery industry.

(5) The most commonly used cathodes, including lithium transition metal oxides and lithium iron phosphate, contain a high oxygen content that could assist in accelerating the thermal runaway and provide oxygen for electrolyte oxidation, increasing the danger of explosion or fire hazard. This is a serious problem that has hampered the widespread implementation of electric vehicles.

For use in a rechargeable lithium metal battery (i.e. a secondary battery using lithium metal as an anode-active material), the chalcogenide is the best known cathode-active material. The chalcogenide is formed of the sulfides, selenides or tellurides of titanium, zirconium, hafnium, niobium, tantalum, or vanadium. A largely overlooked class of cathode active materials is phthalocyanine. There was an earlier attempt to use phthalocyanine-based cathode in a lithium metal battery [J. Yamaki and A. Yamaji, "Phthalocyanine cathode materials for secondary lithium cells," Electrochemical Society Journal, vol. 129, January 1982, p. 5-9; and J. Yamaki and A. Yamaji, U.S. Pat. No. 4,251,607, Feb. 17, 1981]. In addition to the aforementioned dendrite problem, these cathodes (both chalcogenide and phthalocyanine) and related lithium metal batteries suffer from many major issues:

(a) These cathode active materials are electrically insulating and, hence, require the use of a large amount of conductive additives (e.g. carbon black, CB, or acetylene black, AB) that are electrochemically inactive materials (i.e., they do not contribute to the lithium storage capacity, yet adding extra weights to the cell). For instance, in Yamaki et al (1982) cited above, for every 0.1 grams of metal phthalocyanine, 0.1 grams of acetylene were added. With another 10% by weight of a resin binder, the proportion of the cathode active material alone (phthalocyanine itself) in the cathode is less than 50% by weight.

By plotting the cathode specific capacity data listed in Table 1 of Yamaki, et al (1982) we obtained FIG. 1(A), which indicates that the lithium storing capacity per gram of the cathode active material only (hydrogen phthalocyanine, H2Pc) actually decreases with the increasing proportion of the active material amount (or decreasing acetylene black proportion). It is very disturbing that at least 50% by wt. of AB is required. If the weight of acetylene black (AB, a conductive additive) is accounted for, the cathode specific capacity is down to unacceptable values of 71.8-345 mAh/g (of the H2Pc and AB weights combined, not counting the resin binder weight), as indicated in FIG. 1(B). These are much lower than what can be achieved with the theoretical capacity (800-900 mAh/g) of H2Pc.

(b) These lithium metal cells exhibit very poor rate capability. In other words, their lithium storing capacity drops significantly when a higher charge/discharge rate or higher current density is imposed on the cells. Table 2 of Yamaki, et al (1982) indicates that the specific energies of manganese phthalocyanine (MnPc), iron phthalocyanine (FePc), cobalt phthalocyanine (CoPc), and nickel phthalocyanine (NiPc) based on the active material weight alone were 2240, 2300, 1530, and 2220 Wh/kg (of active material weight), respectively, when the discharge current density was at 1 mA (or 5 mA/g based on the combined metal Pc/AB weight of 0.2 g). When the discharge current was increased to 3.14 mA for 0.2 g (or 15.7 mA/g, still a very low discharge rate), the corresponding specific energies dropped to 430, 730, 410, and 370 Wh/kg (of active material weight only), respectively. By dividing these energy density values by a factor of 5, one obtains the estimated cell-level energy densities of 86, 146, 82, and 74 Wh/g that are much lower than those of current lithium-ion cells. These are unacceptably low for consumer electronics, power tool, renewable energy storage, smart grid, and electric vehicle power applications.

(c) These cells are not very reversible and typically have very poor cycling stability and short cycle life. For instance, according to FIG. 10 of Yamaki, et al (1982), most of the cathode specific capacity dropped to an unacceptably low value in less than 30 cycles (the best was only up to 100 cycles, for Cu phthalocyanine).

(d) Most of these cathode active materials are slightly soluble in the liquid electrolyte, gradually losing the amount of cathode active material available for lithium storage. This is more severe for phthalocyanine compounds wherein the anions are highly soluble in commonly used lithium cell electrolytes (e.g. metal phthalocyanine has high solubility below 1 volt vs. Li/Li$^+$). This is presumably a major reason why the cycling stability of these cells is so poor.

(e) All the metal phthalocyanine compounds (MPc) have a catalytic effect on decomposition of electrolytes, creating poor cycle reversibility and stability.

Thus, it is an object of the present invention to provide a phthalocyanine compound-based high-capacity cathode active material (preferably with a specific capacity much greater than 300 mAh/g) for use in a secondary lithium cell (either lithium metal cell or lithium-ion cell) having a long cycle life.

It is another object of the present invention to provide a rechargeable lithium cell featuring a phthalocyanine compound-based high-capacity cathode active material exhibiting a cathode specific capacity greater than 500 mAh/g, typically greater than 1,000 mAh/g, preferably greater than 1,500 mAh/g, or even greater than 1,700 mAh/g.

It is still another object of the present invention to provide a high-capacity cathode active material (with a specific capacity significantly greater than 300 mAh/g, or even >1,700 mAh/g) that can be readily prepared without going through an energy-intensive sintering process.

Another object of the present invention is to provide a high-capacity cathode active material (with a specific capacity greater than 300 mAh/g or even greater than 1,700 mAh/g) that is amenable to being lithium intercalation-free or fast lithium intercalation, leading to a significantly improved power density.

Yet another object of the present invention is to provide a high-capacity cathode active material that is electrically and thermally conductive, enabling high-rate capability and effective heat dissipation.

It is still another object of the present invention to provide a high-capacity cathode active material that contains little or no oxygen, reducing or eliminating the potential fire hazard or explosion.

Still another object of the present invention is to provide a rechargeable lithium cell that has a long charge-discharge cycle life (>300 cycles, preferably >500 cycles, and most preferably >1,000 cycles) and has a phthalocyanine compound-based high-capacity cathode active material that is not significantly soluble in the electrolyte used.

It is an ultimate object of the present invention to provide a high energy density, rechargeable lithium cell that features a high-capacity cathode active material and exhibits an energy density significantly greater than the best of existing Li-ion cells.

SUMMARY OF THE INVENTION

The present invention provides a rechargeable lithium cell, including the lithium metal secondary cell and the lithium-ion secondary cell, which features an encapsulated and protected phthalocyanine compound-based cathode active material. This lithium cell accomplishes all of the aforementioned objectives. No prior art teaching has taught, suggested, or anticipated the instant invention.

In a specific embodiment, the present invention provides an electrode material comprising a phthalocyanine compound encapsulated by a protective material, wherein the phthalocyanine compound is in an amount of from 1% to 99% by weight (preferably from 10% to 99%) based on the total weight of the phthalocyanine compound and the protective material combined. This electrode material is particularly useful for lithium battery cathode applications. Such a cathode exhibits an unprecedentedly high specific capacity and such a battery exhibits an exceptional energy density.

The phthalocyanine compound is selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, or a combination thereof.

The phthalocyanine compound and the protective material may be present in several forms or configurations: for instance, (a) a core-shell structure with a phthalocyanine compound core and a protective material shell (one example of encapsulation); (b) single or multiple primary particles of a phthalocyanine compound are encapsulated or embedded in a protective material to form discrete secondary particles; (c) a phthalocyanine compound forms a discrete layer (thin film) having two primary surfaces with one surface bonded to a current collector and the opposing surface covered with a protective material layer (thin film) so that the phthalocyanine compound is not in direct physical contact with the electrolyte. This protective material layer preferably contains a lithium-conducting material.

The protective material is preferably an electron-conducting and/or a lithium ion-conducting material. The protective material may be selected from a polymer, non-polymeric organic, inorganic polymer (e.g. polysulfide), carbon, metal oxide, lithium metal oxide, lithium-conducting compound (e.g. lithium-conducting glass or composite), non-oxide inorganic, or a combination thereof. The protective material may contain any other type of commonly used cathode active material for a lithium cell, such as $MoS_2$, MoSe, vanadium oxide, lithium transition metal phosphate, etc. These inorganic materials themselves are fair cathode active materials capable of storing some (but not high) amount of lithium; however, they are much less soluble in a commonly used liquid electrolyte as compared to the phthalocyanine compound.

In a preferred embodiment, the protective material contains an intrinsically conductive polymer, a sulfonated polymer, or a combination thereof. The protective material may contain a polymer selected from a water-soluble polymer, a sulfonated polymer, or a combination thereof. In particular, the protective material contains polyethylene oxide, polyethylene glycol, or an aliphatic polyester.

In a highly preferred embodiment, the phthalocyanine compound is encapsulated by the protective material to form a core-shell structure wherein the core comprises the phthalocyanine compound and the shell comprises the protective material. The core-shell structure preferably contains a shell material selected from polythiophene, polyaniline, polypyrrole, a sulfonated polymer, or a combination thereof. The shell polymer may be selected from sulfonated polyaniline, sulfonated polypyrrole, sulfonated polythiophene, sulfonated polyfuran, sulfonated bi-cyclic polymers, derivatives thereof, and combinations thereof.

The phthalocyanine compound is more preferably in an amount of from 50% to 99% by weight and most preferably from 70% to 95% based on the total weight of the phthalocyanine compound and the protective material combined. Where the phthalocyanine compound and the protective material form a core-shell structure, the shell portion is preferably thin to accommodate more lithium-storing active material therein. However, the shell should be of adequate structural integrity. Preferably, the phthalocyanine compound is in a nanoparticle, nano-fiber, or nano-wire form having a dimension smaller than 100 nm, further preferably smaller than 20 nm.

In a desired embodiment, the phthalocyanine compound is encapsulated by a protective material to form a core-shell structure wherein the core has a size no greater than 1 μm and the shell has a thickness no greater than 100 nm. Preferably, the core has a size no greater than 100 nm and the shell has a thickness no greater than 20 nm In a desirable embodiment, single or multiple encapsulated phthalocyanine compound particles may be further wrapped around by a graphene material. The graphene material may be selected from a single-layer sheet or multi-layer platelet of graphene, graphene oxide, fluorinated graphene, halogenated graphene, hydrogenated graphene, nitrogenated graphene, pristine graphene, doped graphene, boron doped graphene, nitrogen doped graphene, chemically treated graphene, reduced graphene oxide, functionalized graphene, functionalized graphene oxide, or a combination thereof.

The present invention further provides a rechargeable lithium cell, including the lithium metal secondary cell and the lithium-ion secondary cell, which contains a cathode comprising an encapsulated phthalocyanine compound as a cathode active material that exhibits an exceptionally high and cycling-stable lithium-storing capacity.

In one preferred embodiment, the inventive cell is a lithium-ion secondary cell composed of (a) an anode comprising an anode active material, wherein the anode active material is a prelithiated lithium storage material or a combination of a lithium storage material and a lithium ion source selected from lithium metal, lithium alloy, or lithium-containing compound; (b) a cathode comprising an encapsulated phthalocyanine compound as a cathode active material; and (c) a porous separator disposed between the anode and the cathode and electrolyte in ionic contact with the anode and the cathode.

In another preferred embodiment, the inventive cell is a lithium metal secondary cell composed of (a) an anode comprising an anode current collector and a lithium ion source selected from lithium metal, lithium ion, or lithium-containing compound; (b) a cathode comprising an encapsulated phthalocyanine compound as a cathode active material; and (c) a porous separator disposed between said anode and said cathode and electrolyte in ionic contact with said anode and said cathode.

In general, the phthalocyanine compound has a distinct characteristic that it is a planar, aromatic molecule that has a high theoretical lithium storage capacity, but extremely low electrical and thermal conductivities. This group of material is also soluble in the commonly used electrolyte in lithium cells. Further, the phthalocyanine compound can act as a catalyst that promotes and accelerates decomposition reactions of the electrolyte.

We have surprisingly observed that the incorporation of a protective material for the phthalocyanine compound (in an encapsulating configuration or, particularly, a core-shell configuration) in the cathode active material can significantly reduce the solubility and catalytic effect of the phthalocyanine compound, and, in some cases, has essentially eliminated these problems. Some protective materials (e.g., conductive materials) also provide good electrical and thermal conductivity to phthalocyanine. These features have resulted in a dramatically improved charge/discharge cycle life and long-term stability of a lithium cell. Also quite surprisingly, the co-existence of a phthalocyanine compound and a protective material can bring out the best of the two cathode active materials, providing an unexpected synergistic effect to achieve a cathode specific capacity that cannot be achieved by either component alone.

The encapsulated phthalocyanine compound may be further wrapped around or embraced by sheets of a graphene material, which is highly conducting. The graphene material is selected from a single-layer sheet or multi-layer platelet of graphene, graphene oxide, fluorinated graphene, halogenated graphene, hydrogenated graphene, nitrogenated graphene, pristine graphene, doped graphene, boron doped graphene, nitrogen doped graphene, chemically treated graphene, reduced graphene oxide, functionalized graphene, functionalized graphene oxide, or a combination thereof. In a preferred embodiment, the graphene cathode active material is pristine graphene containing no oxygen. This is not just due to the significantly higher electric conductivity of pristine graphene, but its surprisingly great ability to capture and store lithium on its surface. The cathode active material preferably contains single-layer graphene sheets.

The lithium ion source may be preferably in a form of solid lithium or lithium alloy foil, lithium or lithium alloy chip, lithium or lithium alloy powder, or surface-stabilized lithium particles. The lithium source may be a layer of lithium or lithium alloy thin film pre-loaded on surfaces of an anode active material.

In a preferred embodiment, the lithium storage material in the anode is selected from a lithiated or non-lithiated version of (a) silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) alloy or intermetallic compound of Si, Ge, Sn, Pb, Sb, Bi, Zn, Al, Ti, Fe, Co, Ni, Mn, Cd, or a mixture thereof; (c) oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) salt or hydroxide of Sn; (e) a carbon or graphite material; or a combination thereof.

In another preferred embodiment, the lithium storage material in the anode of the presently invented cell is selected from graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded multi-walled carbon nano-tube, chemically expanded carbon nano-fiber, or a combination thereof, wherein this lithium storage material has surface areas to capture and store lithium thereon and has a specific surface area greater than 50 $m^2/g$ in direct contact with said electrolyte.

Preferably and typically, the hybrid cathode active material has a specific surface area greater than 50 $m^2/g$, more preferably greater than 100 $m^2/g$, further preferably greater than 500 $m^2/g$, and most preferably greater than 1,000 $m^2/g$.

Also preferably, the primary particles of phthalocyanine compound have a dimension smaller than 100 nm, even more preferably smaller than 20 nm.

In an embodiment, the cathode may further contain a conductive additive and/or a resin binder and the cathode forms a meso-porous structure having a pore size in the range of 2 nm and 50 nm. Conductive fillers can be selected from graphite or carbon particles, carbon black, expanded graphite, carbon nanotube, carbon nano-fiber, carbon fiber, conductive polymer, or a combination thereof. The materials in this list are commonly used as a conductive additive, not as a cathode active material, in lithium-ion batteries.

In a preferred embodiment of the present invention, the lithium storage material in the anode contains a mixture of a high capacity anode material and a high rate capable anode material, wherein the high rate capable anode material is selected from nano-scaled particles or filaments of a transition metal oxide, $Co_3O_4$, $Mn_3O_4$, $Fe_3O_4$, $Li4Ti5O_{12}$, or a combination thereof, and the high capacity anode material is selected from Si, Ge, Sn, SnO, or a combination thereof. Nano-scaled particles or filaments have a dimension (e.g. diameter or thickness) less than 100 nm, enabling a short lithium diffusion time and high power density.

In a particularly preferred embodiment, the anode active material is in the form of a nano particle, nano disc, nano platelet, nano wire, nano-rod, nano belt, nano scroll, nano tube, nano filament, nano coating, or nano film.

Preferably, the anode active material is prelithiated to an initial specific capacity of no less than 500 mAh/g (more preferably no less than 1,000 mAh/g, even more preferably no less than 2,000 mAh/g, and most preferably no less than 3,000 mAh/g) based on the anode active material weight. Preferably, when the lithium-ion cell containing such a prelithiated anode active material is discharged, the anode active material remains not fully discharged; preferably, the anode active material maintains at least 50% of the initial specific capacity.

The electrolyte is preferably organic liquid electrolyte, ionic liquid electrolyte, polymer electrolyte, gel electrolyte, or a combination thereof. The electrolyte typically contains a first amount of lithium ions when the cell is made. The electrolyte preferably comprises lithium salt-containing liquid electrolyte (e.g. organic liquid or ionic liquid) or gel electrolyte in which lithium ions have a high diffusion coefficient. Solid electrolyte is normally not desirable, but some thin layer of solid electrolyte may be used if it exhibits a relatively high diffusion rate. Lithium-containing ionic liquids are particularly desired due to their low volatility and non-flammability (hence, low or no fire or explosion hazard).

Another preferred embodiment of the present invention is a lithium cell comprising: (A) an anode comprising an anode current collector and a lithium ion source selected from lithium metal, lithium ion, or lithium-containing compound; (B) a cathode comprising an encapsulated phthalocyanine compound, wherein the phthalocyanine compound and the protective material forms a core-shell structure and the phthalocyanine compound is selected from metal-free phthalocyanine, copper phthalocyanine, zinc phthalocyanine, tin phthalocyanine, lead phthalocyanine, iron phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, or a combination thereof; and (C) a porous separator disposed between the anode and the cathode and electrolyte in ionic contact with the anode and the cathode. This cell can be a primary cell or a secondary (rechargeable) cell.

BRIEF DESCRIPTION OF THE DRAWINGS

FIG. 1 (A) The cathode specific capacity data (based on the cathode active material weight only) as listed in Table 1 of Yamaki, et al (1982) are plotted as a function of the proportion of the active material (=H2Pc/(H2Pc+AB); (B) The same data were re-calculated based on the H2Pc and AB weights combined, which are more realistic.

DESCRIPTION OF THE PREFERRED EMBODIMENTS

Figure 2A:
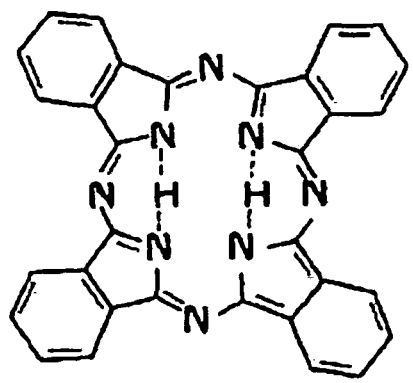
FIG. 2 (A) Chemical formula of H2Pc (as an example of metal-free phthalocyanine compounds); (B) Chemical formula of FePc (as an example of metal phthalocyanine compounds).
Figure 2B:
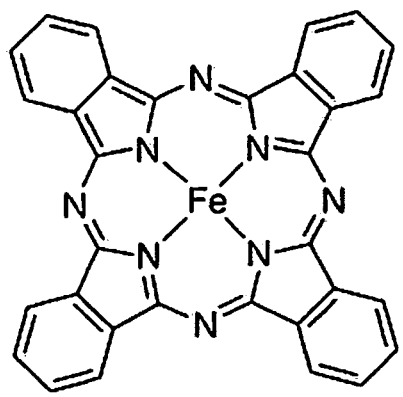

In a first embodiment, the present invention provides an electrode material comprising a phthalocyanine compound encapsulated by a protective material, wherein the phthalocyanine compound is in an amount of from 1% to 99% by weight (preferably from 10% to 99%) based on the total weight of the phthalocyanine compound and the protective material combined.

The present invention also provides a new and distinct type of rechargeable lithium metal or lithium-ion cell, which exhibits the highest energy density of all rechargeable lithium-ion batteries ever reported in battery industry. This new lithium metal or lithium-ion cell features an ultra-high capacity cathode (containing an encapsulated of protected phthalocyanine compound as a cathode active material) having an ability to store lithium ions up to a specific capacity of 1,780 mAh/g, which is 7 times higher than the best capacity (250 mAh/g) of conventional Li-ion battery cathode materials. When combined with an anode active material with an ultra-high capacity anode (e.g. Li metal or prelithiated silicon), this cathode enables the lithium-ion cell to store a cell-level energy density of up to 400-620 Wh/kg, in contrast to the typical 150-200 Wh/kg of conventional Li-ion cells. These experimental values are shocking and completely beyond and above the expectations of even the most skilled workers in the art of electrochemistry or batteries.

The presently invented rechargeable lithium cell is preferably composed of (a) an anode comprising an anode active material, wherein the anode active material is a prelithiated lithium storage material or a combination of a lithium storage material and a lithium ion source selected from lithium metal, lithium alloy, or lithium-containing compound; (b) a cathode comprising an encapsulated or protected phthalocyanine compound as a cathode active material; and (c) a porous separator disposed between the anode and the cathode and electrolyte in ionic contact with the anode and the cathode. This is essentially a lithium-ion cell.

Alternatively, the anode is composed of an anode current collector and a lithium ion source selected from lithium metal, lithium ion, or lithium-containing compound. The only anode active material is this lithium ion source. This is essentially a type of rechargeable lithium metal cell.

The phthalocyanine compound may be selected from a metal phthalocyanine compound (such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, or silver phthalocyanine), or a metal-free phthalocyanine (e.g. hydrogen phthalocyanine), or a combination thereof. This group of material has a distinct characteristic that it is a planar, aromatic molecule that has a high theoretical lithium storage capacity, but extremely low electrical and thermal conductivities.

The protective material is preferably an electron-conducting and/or a lithium ion-conducting material. The protective material may be selected from an organic polymer, non-polymeric organic, inorganic polymer, carbon, pitch, metal oxide, lithium metal oxide, lithium-conducting compound (e.g. lithium-conducting glass or composite), or a combination thereof.

Carbon is preferably amorphous carbon, carbonized resin (polymeric carbon), CVD carbon (produced via chemical vapor deposition), or sputtering carbon (produced by sputtering or plasma-enhanced sputtering). Pitch can be a petroleum pitch, coal tar pitch, etc.

In a preferred embodiment, the protective material contains an intrinsically conductive polymer, a sulfonated polymer, or a combination thereof. The protective material may contain a polymer selected from a water-soluble polymer, a sulfonated polymer, or a combination thereof. In particular, the protective material contains polyethylene oxide, polyethylene glycol, or an aliphatic polyester.

The phthalocyanine compound and the protective material may be present in several forms or configurations: for instance, (a) a core-shell structure with a phthalocyanine compound core and a protective material shell (one example of encapsulation); (b) single or multiple primary particles of a phthalocyanine compound are encapsulated or embedded in a protective material to form discrete secondary particles; (c) a phthalocyanine compound forms a discrete layer (preferably a thin film having a thickness<200 μm and more preferably <100 μm) having two primary surfaces with one surface being bonded to a current collector and the opposing surface covered with a protective material layer (ultra-thin film having a thickness preferably <10 μm, more preferably <1 μm, and most preferably <100 nm) so that the phthalocyanine compound is not in direct physical contact with the electrolyte. This protective material layer preferably contains a lithium-conducting material.

In a highly preferred embodiment, the phthalocyanine compound is encapsulated by the protective material to form a core-shell structure wherein the core comprises the phthalocyanine compound and the shell comprises the protective material. The core-shell structure preferably contains a shell material selected from polythiophene, polyaniline, polypyrrole, a sulfonated polymer, or a combination thereof. The shell polymer may be selected from sulfonated polyaniline, sulfonated polypyrrole, sulfonated polythiophene, sulfonated polyfuran, sulfonated bi-cyclic polymers, derivatives thereof, and combinations thereof. The primary phthalocyanine compound particles preferably have a dimension less than 100 nm, further preferably less than 20 nm. The resulting secondary particles preferably have a dimension in the range of 1-20 μm.

In another alternative configuration, a phthalocyanine compound comprises a discrete layer having two opposing primary surfaces with one surface being bonded or connected to a cathode current collector. This phthalocyanine compound layer is protected by a layer of protective material in such a manner that the phthalocyanine compound is not in direct contact with the electrolyte in a cell. This protective material layer should allow lithium ions to readily diffuse through. The protective material layer can be readily deposited onto the opposing surface of the phthalocyanine compound layer via a wide array of deposition methods, e.g. coating, casting, physical vapor deposition, chemical vapor deposition, sputtering, spraying, printing, etc. There is no particular restriction on the type of deposition method, but the deposition method must be conducted at a temperature sufficiently low to avoid vaporizing or decomposing the underlying phthalocyanine compound layer. The protective layer may also be deposited using one or more of the following methods: polymerization (radical polymerization, chemical oxidation polymerization, and electro-polymerization), sol-gel method, reverse-micelle method, and electrodeposition.

A protective or shell polymer can be a sulfonated polymer selected from the group consisting of poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated polystyrene, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends, and combinations thereof. These materials have been used as solid electrolyte materials for proton-exchange membrane fuel cells due to their relatively good proton conductivity. They have never been proposed to be useful for lithium battery cathode applications (i.e. as a shell material to protect the phthalocyanine compound).

A protective shell material in a core-shell structure protective material may be selected from an organic polymer, non-polymeric organic, inorganic polymer, carbon, pitch, metal oxide, lithium metal oxide, non-oxide inorganic, lithium-conducting compound, lithium-storing compound having a lower solubility than the solubility of the core phthalocyanine compound in an intended electrolyte, or a combination thereof. This low-solubility, lithium-storing compound can be selected from any commonly used cathode active material of a lithium metal cell or lithium-ion cell.

For use in the presently invented cell, transition metal phthalocyanine compounds, such as iron phthalocyanine (FePc), nickel phthalocyanine (NiPc), manganous phthalocyanine (MnPc), and cobalt phthalocyanine, are particularly desirable due to their high lithium storage capacities and the high cell voltages when they pair up with selected anode active materials. They are also found to be chemically compatible with the graphene materials.

The encapsulated phthalocyanine compound, particularly the core-shell structure, for use as an electrode material in an electrochemical energy storage device can be produced using the following main methods: polymerization (radical polymerization, chemical oxidation polymerization, and electro-polymerization), sol-gel method, reverse-micelle method, mechano-chemical method, and electrodeposition. Some other methods of synthesis include mechanical attrition, colloidal chemical synthesis, layer deposition, and the like.

Radical Polymerization:

The polymerization, on or around a phthalocyanine compound, could be a free radical polymerization or an atom transfer radical polymerization (ATRP). The ATRP process is better than the free radical polymerization as control of molecular weight and size of the particle can be better achieved. The coating of polymer on phthalocyanine compound nanoparticles can be readily conducted by ATRP. In a preferred approach, the surface of the phthalocyanine compound particle may be modified with a suitable initiator first. One of the methods is to attach a bromine group to the phthalocyanine compound surface and then the treated phthalocyanine compound particles are add to a solution containing the monomer of the intended shell polymer (e.g., non-conducting polymer of t-butyl acrylate).

Chemical Oxidation Polymerization:

The core phthalocyanine compound particle (preferably nano particle or short nano-wire) may be attached with suitable chemical groups which allow the monomer (generally aromatic compounds) to form adduct. The monomer can be polymerized by adding a suitable oxidizing agent. There might be acidic or basic groups attached to the surface that induces modification. Such a method can be used to produce encapsulated phthalocyanine compound particles having a phthalocyanine compound core and a shell of polyaniline or polypyrrole.

Sol Gel Method:

This method of synthesis is used generally for the preparation of nanoparticles having a metal oxide shell or lithium transition metal oxide shell. This method has been commonly used for an inorganic matrix that forms a gel, like silica. The steps can include formation of the solution containing the salt of the phthalocyanine compound and silica based compound. The solution is then heat treated to induce gelation, also allowing the phthalocyanine compound to precipitate out as nanoparticles. These are then subjected to heat in ordinary atmosphere forming an oxide shell on surface of the phthalocyanine compound nanoparticles. For the phthalocyanine compound core and the metal oxide shell, the phthalocyanine compound (already in a particle form) can be added to metal salt solution, allowing metal to form as a coating on the phthalocyanine compound surface. The metal coating, typically and preferably in nanometer thickness, is then oxidized.

Reverse Micelle Method:

One of the major concerns in the synthesis of encapsulated nanoparticles, particularly core/shell nanoparticles, is the ability to exercise good control over the particle size and morphology. This can be obtained by conducting the synthesis in emulsions or in solutions that form micelles. Micelles are formed by mixing aqueous reactant with a suitable surfactant. Micelles act as the center for nucleation and epitaxial growth of nanoparticles. The molar ratio of the surfactant to water is a primary parameter that affects the size and morphology of the resultant particles. These particles can be further processed to obtain core/shell structure by oxidation polymerization as discussed above.

Mechanochemical Synthesis:

Mechanochemical synthesis as the name suggests involves mechanical and chemical means of encapsulated particle synthesis. For instance, the sonochemical synthesis involves chemical reaction for nanoparticle synthesis and sonication to improve the speed of reaction, breakdown the particles, and enhance the dispersion of particles in the solvent. Ultrasonic irradiation of the frequency range 20 kHz to 1 MHz has been used in most of the sonication methods. Ultrasonic irradiation speeds up the reaction because of the localized cavities that are formed and they last only for a short time. Thus, these cavities act as micro reactors for the reaction to occur and the mechanical effects to also take place. The mixture of reactants in suitable solution is subjected to ultrasonic waves and the temperature and pH maintained to obtain the phthalocyanine compound nanoparticles dispersed in silica or in matrix material. The chemical reaction that occurs depends on the shell required as core is synthesized separately and added to the reactant mixture. Reduction reactions are carried out for metallic shells and in situ polymerization for polymeric shells and non-metallic shells.

Electrodeposition:

The formation of the shell of encapsulated nanoparticles from a charged polymer or inorganic material can be carried out by this method. The electric pulse is varied (e.g. like a square wave) and it is found that the metal deposits during negative cycle while polymer deposits during positive cycle. This gives control over the size of the nanoparticles. The mode of operation is galvanization and, hence, the deposition occurs on one of the electrodes. The matrix material for nanoparticles can be the electrode or the electrolytic medium. Polypyrrole shell can be deposited using this method.

Secondary particles of encapsulated phthalocyanine compound primary particles may be further wrapped around or embraced by sheets of a graphene material. A graphene sheet is essentially an atom-thick fabric that is exceptionally flexible and strong. This 2-D hexagon of carbon atoms is an ideal wrapping material for the encapsulated phthalocyanine compound.

The graphene materials may be selected from a single-layer sheet or multi-layer platelet of graphene, graphene oxide, graphene fluoride, hydrogenated graphene, nitrogenated graphene, pristine graphene, doped graphene, boron doped graphene, nitrogen doped graphene, chemically treated graphene, reduced graphene oxide, functionalized graphene or graphene oxide, or a combination thereof. In the present application, nano graphene platelets (NGPs) or "graphene materials" collectively refer to single-layer and multi-layer versions of graphene, graphene oxide, graphene fluoride, hydrogenated graphene, nitrogenated graphene, doped graphene, etc.

The thickness of an NGP is no greater than 100 nm and, in the present application, no greater than 10 nm (preferably no greater than 5 nm). The NGP may be single-layer graphene. In the presently defined NGPs, there is no limitation on the length and width, but they are preferably smaller than 10 µm and more preferably smaller than 1 µm. We have been able to produce NGPs with length smaller than 100 nm or larger than 10 µm. The NGP can be pristine graphene (with essentially 0% oxygen content) or graphene oxide (typically from 10 up to approximately 45% by weight oxygen). Graphene oxide can be thermally or chemically reduced to become reduced graphene oxide (typically with an oxygen content of 1-10%, mostly below 5% by weight). For use in the cathode of the lithium-ion cell, the oxygen content is preferably in the range of 0% to 10% by weight, and more preferably in the range of 0% to 5% by weight.

Graphene materials may be produced by using the following recommended procedures:
(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);
(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness<100 nm could be formed at this stage if the intercalation/oxidation step was allowed to proceed for a sufficiently long duration of time; e.g. >24 hours);
(c) dispersing the exfoliated graphite to a liquid medium to obtain a graphene-liquid suspension;
(d) aerosolizing the graphene-liquid suspension into liquid droplets while concurrently removing the liquid to recover curved NGPs.

It may be noted that steps (a) to (b) are the most commonly used steps to obtain exfoliated graphite and graphene oxide platelets in the field. Step (d) is essential to the production of curved graphene sheets. Oxidized NGPs or GO platelets may be chemically reduced to recover conductivity properties using hydrazine as a reducing agent, before, during, or after chemical functionalization.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production."

Nitrogenated graphene, nitrogen-doped graphene, or boron-doped graphene can be produced from chemical synthesis, chemical vapor deposition (CVD), or ion implantation. For instance, nitrogen-doped graphene can be produced from CVD using $CH_4$ as a carbon source, $NH_3$ as a nitrogen source, nano-scaled Cu/Ni particles (or Cu, Ni, or Cu/Ni, foil) as a catalyst. Boron-doped graphene can be produced by boron ion implantation.

The particles of an encapsulated phthalocyanine compound may be added to a graphene-solvent solution (e.g. graphene oxide-water solution) to form a suspension or slurry, which is then spray-dried to form graphene-wrapped encapsulated or core-shell particles.

The encapsulated particles are preferably packed into a meso-porous structure with a desired amount of meso-scaled pores (2-50 nm, preferably 2-10 nm) to allow the entry of electrolyte. This is advantageous because these pores enable a great amount of surface areas to be in physical contact with electrolyte and capable of capturing lithium from the electrolyte. These surface areas are typically and preferably >50 $m^2/g$, more preferably >500 $m^2/g$, and further more preferably >1,000 $m^2/g$. This high specific surface area can be achieved if the primary particles of the encapsulated phthalocyanine compound are small in diameter, preferably less than 100 nm and most preferably less than 20 nm. These small primary particles may be packed into secondary particles 1-10 μm in diameter.

The presently invented cell also contains a negative electrode (anode) comprising an anode active material for inserting and extracting lithium during the charge and discharge of the cell, wherein the anode active material is mixed with a conductive additive and/or a resin binder to form a porous electrode structure, or coated onto a current collector in a coating or thin film form (e.g. film thickness<100 μm). The anode active material preferably has a lithium storage capacity greater than 400 mAh/g. The anode active material is preferably nano-scaled material having a dimension less than 100 nm, preferably less than 20 nm.

It may be noted that graphite crystals in a graphitic or carbonaceous material contain graphene planes having an inter-graphene plane spacing of approximately 0.34 nm. We have experimentally observed that, by oxidizing or fluorinating the graphite crystals one can increase the inter-graphene spacing to >0.40 nm, more typically>0.50 nm, and most typically>0.60 nm. We have further observed that these expanded graphite crystals with extra spaces between graphene planes can accommodate great amounts of lithium atoms when used as an anode active material.

This cell preferably contains a meso-porous graphitic or carbonaceous material-based anode containing active surfaces for capturing and storing lithium atoms thereon. The graphitic material may be selected from graphene sheets, graphite worms, exfoliated graphite flakes, expanded graphite, chemically treated graphite with an inter-graphene planar separation no less than 0.4 nm (preferably greater than 0.5 nm, more preferably greater than 0.6 nm), soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nano-tube, chemically expanded carbon nano-fiber, or a combination thereof. The graphitic material optionally may also have the capability to store some lithium in the bulk (interior) of graphitic material particles.

The rechargeable Li cell further contains a porous separator disposed between the anode and the cathode; a lithium-containing electrolyte in physical contact with the two electrodes (the anode and the cathode); and a lithium source disposed in the anode (if the anode active material is not pre-lithiated) when the cell is made. In one preferred embodiment, the anode active material is not pre-lithiated and is lithium-free when the cell is made.

Several types of lithium sources may be implemented to provide the lithium ions that are needed for shuttling between the anode and the cathode. Examples of the sources are a lithium chip, lithium alloy chip, lithium foil, lithium alloy foil, lithium powder, lithium alloy powder, surface stabilized lithium particles, a mixture of lithium metal or lithium alloy with a lithium intercalation compound, lithium or lithium alloy film coated on a surface of an anode or cathode active material, or a combination thereof.

In this preferred embodiment of the present invention, the anode active material is not prelithiated since there is a lithium ion source already. In particular, the anode active material is a non-prelithiated material selected from the group consisting of: (a) Non-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Non-lithiated alloys or intermetallic compounds of Si, Ge, Sn, Pb, Sb, Bi, Zn, Al, Ti, Co, Ni, Mn, Cd, and their mixtures; (c) Non-lithiated oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Non-lithiated salts or hydroxides of Sn; and (e) graphite or carbon material in a powder or fibrous form. Unless the anode active material is directly coated onto a current collector, the anode active material is typically mixed with a conductive additive and/or a resin binder to form a porous electrode structure that is electrically connected to the anode current collector.

During the first discharge cycle of the cell after it is made, the lithium source releases lithium ions into the electrolyte. These lithium ions migrate through the porous separator into the cathode and get captured by the cathode, via surface-capturing of Li (Li adsorbed on surfaces of phthalocyanine molecules) and Li intercalation (into inter-molecular spaces in a phthalocyanine compound crystal).

During the subsequent re-charge of the cell, lithium ions are released from cathode and migrate back to the anode side. These lithium ions then intercalate into the interior of anode active material particles or coating, or get captured by graphene surfaces when available. The subsequent discharge cycle involves releasing lithium ions from the anode active material through de-intercalation, de-sorption, or dissolution. In a preferred embodiment, the aforementioned non-lithiated anode active material is in the form of a nano particle, nano disc, nano platelet, nano wire, nano-rod, nano belt, nano scroll, nano tube, nano filament, nano coating, or nano film, having a dimension less than 100 nm, preferably less than 20 nm.

Preferably, the anode active material contains a mixture of a high capacity anode material and a high rate capable anode material, wherein the high rate capable anode material is selected from nano-scaled particles or filaments of a transition metal oxide, $Co_3O_4$, $Mn_3O_4$, $Fe_3O_4$, or a combination thereof, and the high capacity anode material is selected from Si, Ge, Sn, SnO, or a combination thereof. Nano-scaled particles or filaments have a dimension (e.g. diameter or thickness) less than 100 nm, enabling a short lithium diffusion time and high power density.

It has been commonly believed that a high specific surface area is an undesirable feature of either an anode or a cathode for a lithium-ion cell based on the belief that a higher surface area leads to the formation of more solid-electrolyte interface (SED, a common cause of capacity irreversibility or capacity loss. We have herein defied this expectation and discovered that the meso-porous hybrid cathode materials can be superior cathode materials for lithium-ion cells, which could operate thousands of cycles without any significant capacity decay. This is truly unexpected.

Even more surprisingly, the meso-porous structure of encapsulated phthalocyanine particles, when incorporated as a cathode active material having a specific surface area greater than 50 $m^2/g$ and pores of 2-50 nm in size, exhibit a specific capacity significantly higher than that of any commonly used lithium ion cell cathode. For instance, the micron-sized layered $LiCoO_2$ used in a lithium-ion battery exhibits a specific capacity typically lower than 160 mAh/g. The highest-capacity cathode active material for the lithium-ion cell is likely vanadium oxide that has a theoretical specific capacity of approximately 430 mAh/g, but a practically achievable capacity of 250 mAh/g. In contrast, we have routinely achieved a cathode specific capacity of 500-2,200 mAh/g when a meso-porous structure of secondary particles (composed of primary particles of encapsulated phthalocyanine) is used as a cathode active material in a rechargeable lithium metal or lithium-ion cell.

In an embodiment of the present invention, one may choose to add a conductive additive and/or a binder material (e.g. binder resin or carbonized resin) to form an electrode (cathode or anode) of structural integrity. A conductive additive is generally needed in the anode of the presently invented lithium-ion cell since many of the non-carbon or non-graphite based anode active materials are inorganic materials (e.g., Si, SnO, and $Mn_3O_4$) that are not electrically conducting. The conductive additive or filler may be selected from any electrically conductive material, but is advantageously selected from graphite or carbon particles, carbon black, expanded graphite, graphene, carbon nano-tube, carbon nano-fiber, carbon fiber, conductive polymer, or a combination thereof. The amount of conductive fillers is preferably no greater than 30% by weight based on the total cathode electrode weight (without counting the cathode current collector weight), preferably no greater than 15% by weight, and most preferably no greater than 10% by weight. The amount of binder material is preferably no greater than 15% by weight, more preferably no greater than 10%, and most preferably no greater than 5% by weight.

Preferred electrolyte types include liquid electrolyte, gel electrolyte, polymer electrolyte, solid electrolyte, and ionic liquid electrolyte (preferably containing lithium salts dissolved therein), or a combination thereof.

Another preferred embodiment of the present invention is a rechargeable lithium cell comprising: (a) an anode comprising an anode active material, wherein said anode active material is a prelithiated lithium storage material; (b) a cathode comprising an encapsulated phthalocyanine compound as a cathode active material; and (c) a porous separator disposed between the anode and the cathode and electrolyte in ionic contact with the anode and the cathode.

In this cell, the prelithiated lithium storage material in the anode is preferably in the form of a nano particle, nano disc, nano platelete, nano wire, nano-rod, nano belt, nano scroll, nano tube, nano filament, nano coating, or nano film. The pre-lithiated lithium storage material may be selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) a pre-lithiated salt or hydroxide of Sn; or (e) a pre-lithiated carbon or graphite material. Preferably, this anode active material is electrically connected directly to an anode current collector or is connected to an anode current collector through a binder and/or a conductive additive.

In a further preferred embodiment, the anode active material contains a mixture of a high capacity anode material and a high rate capable anode material, wherein the high rate capable anode material is selected from nano-scaled particles or filaments of a lithium transition metal oxide, lithiated $Co_3O_4$, lithiated $Mn_3O_4$, lithiated $Fe_3O_4$, $Li_4Ti_5O_{12}$, or a combination thereof, and the high capacity anode material is selected from pre-lithiated Si, Ge, Sn, SnO, or a combination thereof.

Preferably, the anode active material is prelithiated to an initial specific capacity of no less than 500 mAh/g (more preferably no less than 700 mAh/g, even more preferably no less than 1,000 mAh/g, further preferably no less than 1,500 mAh/g, and most preferably no less than 2,000 mAh/g) based on the anode active material weight. Preferably, when the lithium-ion cell containing such a prelithiated anode active material is discharged, the anode active material is not fully discharged; instead, the anode active material maintains at least 50% of the initial specific capacity. Materials such as Si, Ge, and Sn oxide can be prelithiated to an initial capacity of >1000 mAh/g; Si can be prelithiated to >4,000 mAh/g. These are preferred choices for an anode active material.

The carbonaceous or graphitic material for use in the anode of the instant invention may be graphite worms, exfoliated graphite flakes (with a thickness>100 nm), expanded graphite (with a thickness>100 nm), chemically treated graphite with an inter-graphene planar separation no less than 0.4 nm (preferably greater than 0.5 nm, more preferably greater than 0.6 nm), soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nano-tube, chemically expanded carbon fiber or nano-fiber, or a combination thereof. These carbonaceous or graphitic materials have one thing in common; they all have meso-scaled pores, enabling entry of electrolyte to access their interior graphene planes.

In one preferred embodiment, the meso-porous carbonaceous or graphitic material may be produced by using the following recommended procedures:

(e) dispersing or immersing a graphitic or carbonaceous material (e.g., powder of natural graphite, artificial graphite, meso-phase carbon, meso-carbon micro bead (MCMB), soft carbon, hard carbon, coke, polymeric carbon (carbonized resin), activated carbon (AC), carbon black (CB), multi-walled carbon nanotube (MWCNT), carbon nano-fiber (CNF), carbon or graphite fiber, meso-phase pitch fiber, and the like) in a mixture of an intercalant and/or an oxidant (e.g., concentrated sulfuric acid and nitric acid) and/or a fluorinating agent to obtain a graphite intercalation compound (GIC), graphite oxide (GO), graphite fluoride (GF), or chemically etched/treated carbon material;

(f) exposing the resulting GIC, GO, GF, or chemically etched/treated carbon material to a thermal shock, preferably in a temperature range of 600-1,100° C. for a short period of time (typically 15 to 60 seconds) to obtain exfoliated graphite or graphite worms; and optionally (g) subjecting the resulting graphite worms to air jet milling to obtain expanded graphite (with graphite flakes thicker than 100 nm).

Alternatively, after step (a) above, the resulting GIC, GO, GF, or chemically etched/treated carbon/graphite material is subjected to repeated rinsing/washing to remove excess chemical. The rinsed products are then subjected to a drying procedure to remove water. The dried GO, GF, chemically treated CB, chemically treated AC, chemically treated MWCNT, chemically treated CNF, chemically treated carbon/graphite/pitch fiber can be used as an anode active material of the presently invented high-capacity Li-ion cell. These chemically treated carbonaceous or graphitic materials can be further heat-treated at a temperature preferably in the range of 150-1,100° C. for the purposes of thermally reducing the oxidized material, thermally exfoliating/expanding the carbonaceous/graphitic material (for increasing inter-planar spacing between two hexagonal carbon planes or graphene planes), and/or creating meso-scaled pores (2-50 nm) to enable the interior structure being accessed by electrolyte. It may be noted that these interior graphene planes remain stacked and interconnected with one another, but the above-described chemical/thermal treatments facilitate direct access of these interior graphene planes by lithium ion-carrying electrolyte.

The broad array of carbonaceous materials, such as a soft carbon, hard carbon, polymeric carbon (or carbonized resin), meso-phase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

Hard carbon refers to a carbonaceous material composed of small graphite crystals wherein these graphite crystals or stacks of graphene planes inside the material are not oriented in a favorable directions (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc). These materials per se (without chemical/thermal treatments as described above) are not good candidate cathode materials for the presently invented high-capacity Li-ion cells. Hence, preferably, they are subjected to further chemical etching or chemical/thermal exfoliation to form a meso-porous structure having a pore size in the range of 2-50 nm (preferably 2-10 nm). These meso-scaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electro-active materials whose structures and physical properties can be readily tailor-made.

Phenol formaldehyde resin and petroleum and coal tar pitch materials may be subjected to heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon meso-porous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres, which can be further carbonized and graphitized.

The following examples serve to illustrate the preferred embodiments of the present invention and should not be construed as limiting the scope of the invention:

EXAMPLE 1: Preparation of FePc-Polythiophene Core-Shell Structures

For the purpose of investigating conducting polymer-protected phthalocyanine (using FcPc) as an example), FePc-polythiophene (Pc-PT) core-shell composites and neat polythiophene were synthesized by an in situ chemical oxidative polymerization method. Thiophene monomer (1.34, 2.68, and 5.26 g) was dissolved in 50 mL of chloroform to obtain monomer solutions. Three separate batches of solutions of 10.00 g of FePc, 100 mL of chloroform, and different amounts of $FeCl_3$ (4:1 m/m $FeCl_3$/thiophene) were separately added to three 3-necked flasks, which were each stirred for 30 min. The thiophene monomer mixture was added slowly to the afore-mentioned flasks, and the mixture in each flask was stirred for 10 h at 0° C. After polymerization, 100 mL of methanol was added to the mixture to dissolve the remaining iron chloride. The mixture was then filtered to remove the iron ions, and the remaining insoluble solid was collected. This washing step was repeated three times. After this, the solid was transferred to a flask and 100 mL of 1 M hydrochloric acid was added. The mixture was stirred for 2 hours at room temperature, and then the remaining solid was collected by filtration and washed using deionized water until a neutral pH was obtained. Finally, the brown mass was dried at 60° C. for 24 hours under vacuum to give the pure Pc-PT powder. Neat polythiophene without the presence of FePc was also synthesized following a similar procedure.

EXAMPLE 2: Preparation of Various Phthalocyanine-Carbon (Pc/C) Core-Shell Structures from Malic Acid Pure metal-free and various transition metal phthalocyanine nanoparticles were initially prepared through controlled precipitation of a phthalocyanine-solvent solution in a rigorously stirred non-solvent. Phthalocyanine nanoparticles alone were found to exhibit poor electrochemical performance because of the easy aggregation of nanoparticles, high inter-particle contact resistance, and high solubility in the liquid portion of electrolyte.

Presumably, one could coat a layer of conducting material on the surface of a phthalocyanine compound particle, completely embracing the particle, to overcome the above-cited problems. However, it has not been known as to what type of material could play such a role. In particular, there has been no teaching about the ability of any electrically conductive or non-conductive material to hermetically wrap around a phthalocyanine compound particle, preventing dissolution of the compound in a lithium battery yet still allowing lithium ions to permeate through such a protective layer. After an extensive and in-depth investigation, we have observed that certain kinds of carbon coating are capable of encapsulating and protecting particles of a broad array of phthalocyanine compounds, such as FePc, CoPc, NiPc, MnPc, and NPc (a metal-free phthalocyanine), preventing dissolution loss and enabling migration of Li ions through the carbon coating during battery charge/discharge cycles.

Carbon coating layers could be produced by pyrolyzing a resin (e.g. phenolic resin) or other organic carbon source (e.g. glucose and sucrose) at a relatively high temperature (typically above 500° C.). Unfortunately, all phthalocyanine compounds get sublimed at a temperature lower than 300° C. and thermally decomposed at a temperature lower than 500° C. After some diligent research work, we observed that the carbohydrates could be carbonized at a temperature lower than 300° C., some even lower than 200° C. For instance, carbon coating could be generated to protect or encapsulate Pc nanoparticles at a relatively low temperature (180° C.) by using malic acid ($C_4H_6O_5$). In a typical procedure, Pc and malic acid with a weight ratio of 1:2 were dispersed together in toluene under magnetic stirring at room temperature for 2 h and the slurry was dried at 180° C. overnight in the vacuum oven. The recovered product contains uniform core/shell nanoparticles with a phthalocyanine core and carbon shell. Surprisingly, these core-shell particles are largely separated, discrete particles with no aggregation or coalescence problem. This process is highly scalable for cost-effective mass production. Most unexpectedly, the resulting carbon coating was found to be sufficiently hermetic against migration or dissolution of phthalocyanine in commonly used lithium battery electrolytes.

EXAMPLE 3: Preparation of Various Polymer Protected Phthalocyanine Compounds Emulsion polymerization was found to provide simple and direct route for the preparation phthalocyanine compound nanoparticles embedded into polymeric nanospheres. In a typical process, phthalocyanine compound nanoparticles are first dispersed in an aqueous solution containing a statistical oligomer constituted of five butyl acrylate and ten acrylic acid units prepared by reversible addition fragmentation chain transfer (RAFT) polymerization using a trithiocarbonate as RAFT agent. Then, emulsion polymerization is initiated, leading to the formation of thin polymer coating around phthalocyanine compound nanoparticles.

EXAMPLE 4: Preparation of Various Phthalocyanine Compounds Protected by Water Soluble Polymers or Sulfonated Polymers A protective or shell polymer can be a sulfonated polymer, e.g. poly(perfluoro sulfonic acid), sulfonated poly (tetrafluoroethylene) (s-PTFE), and sulfonated poly(ether ether ketone) (s-PEEK). In particular, a shell polymer may be selected from sulfonated polyaniline, sulfonated polypyrrole, sulfonated polythiophene, sulfonated polyfuran, sulfonated bi-cyclic polymers, etc. Water-soluble polymers of interest include poly (ethylene oxide) (PEO) and polyethylene glycol (PEG). In a typical procedure of preparing protected or embraced phthalocyanine compound particles, a polymer is dissolved in a solvent (e.g. water) typically in a weight fraction of 0.1-5.0% to form a solution. Fine powders (preferably nano-scaled) are then added to this polymer solution to form a suspension or slurry, which is then dried in a vacuum oven or spray-dried to form protected particles. These thin polymer coatings were surprisingly found to be conducting to lithium ions.

EXAMPLE 5: Preparation of Various Phthalocyanine Compounds Protected by Lithium Ion-Conducting Materials We have found that those commonly used cathode active materials (capable of storing lithium) in a lithium-ion battery or a lithium-metal battery can be a good protective material for a phthalocyanine compound provided one can incorporate a lithium-storing material into the protective shell, embracing a core phthalocyanine compound particle. A good example of such a lithium storage material is vanadium oxide ($V_2O_5$), which is significantly less soluble in a liquid electrolyte such as $LiPF_6$ or $LiClO_4$ salt in propylene carbonate (PC).

In a typical procedure of preparing protected or embraced phthalocyanine compound particles, $V_2O_5$ is dissolved in water, typically in a weight fraction of 0.1-2.0% to form a solution. Fine powder (preferably nano-scaled) of a phthalocyanine compound is then added to this $V_2O_5$ solution to form a suspension or slurry, which is then dried in a vacuum oven or spray-dried to form $V_2O_5$-protected phthalocyanine compound particles.

The some of the $V_2O_5$-protected phthalocyanine compound particles were then re-dispersed into a graphene oxide-water solution prepared in Example 6 below. The resulting suspension was then spray-dried again to obtain graphene-wrapped, $V_2O_5$-protected phthalocyanine compound particles.

EXAMPLE 6: Oxidation and Exfoliation of Natural Graphite to Produce GO

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 7. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes.

EXAMPLE 7: Preparation of a Metal-free Naphthalocyanine (NPc) and Carbon-Encapsulated-NPc Cathode The starting material, 2,11,20,29-Tetra-tert-butyl-2,3-naphthalocyanine (NPc), was purchased from Aldrich. Phthalocyanine-carbon (NPc/C) core-shell structures from malic acid were prepared according to a procedure described in Example 2.

COMPARATIVE EXAMPLE 7: Preparation of a Metal-free Naphthalocyanine-Acetylene Black Hybrid Cathode As a control sample, we have also prepared a hybrid material from acetylene black (AB) and NPc through manual mixing and ball-milling. In a typical procedure, a mixture of NPc and AB powder with a controlled weight ratio was hand-ground in a mortar by pestle for 20 minutes to 1 hour.

Figure 3A:
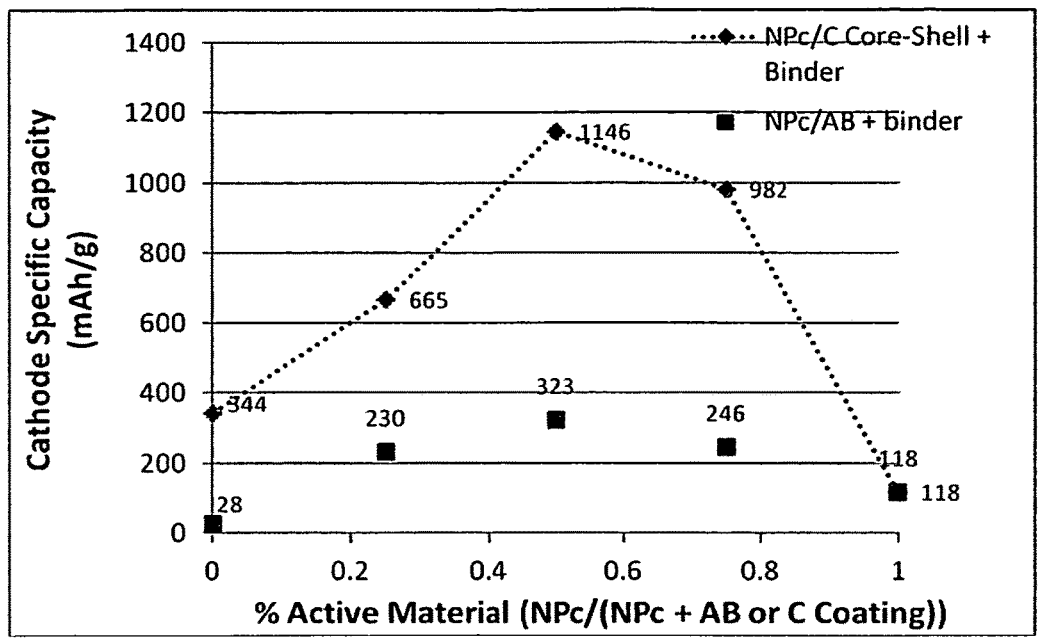
FIG. 3 (A) Cathode specific capacity of a series of composite cathodes made up of 2,11,20,29-Tetra-tert-butyl-2,3-naphthalocyanine (NPc) and acetylene black (AB) and that of NPc-C core-shell materials; (B) Cathode specific capacity of a series of C-encapsulated MnPc material cathodes and the baseline (MnPc+AB) composite cathode. Li metal foil was used as the anode active material.

The cathode specific capacities of a series of composite cathodes made up of 2,11,20,29-Tetra-tert-butyl-2,3-naphthalocyanine (NPc) and acetylene black (AB) were measured using a coin cell configuration containing lithium metal foil as the anode active material. The data, obtained from galvanostatic charge/discharge cycling tests, were plotted as a function of the NPc proportion at the cathode (NPc/[NPc+AB]) in FIG. 3(A). The corresponding data for C/NPc core-shell particle cathodes were also included. It may be noted that the specific capacity of the malic acid-derived carbon coating material, when used alone without NPc, is 344 mAh/g and that of NPc without any conductive additive is 118 mAh/g (the theoretical lithium storage capacity of NPc is estimated to be at approximately 800 mAh/g provided that every available NPc site is utilized). These data have demonstrated that there exists a highly significant (actually quite dramatic) synergistic effect between NPc and this carbon coating or shell material. The specific capacity values of 665, 1146, and 982 mAh/g (based on the NPc, C, and binder weights combined, not just the NPc weight) are higher than the very best values of all cathode active materials ever reported for Li metal or Li-ion secondary cells.

Figure 3B:
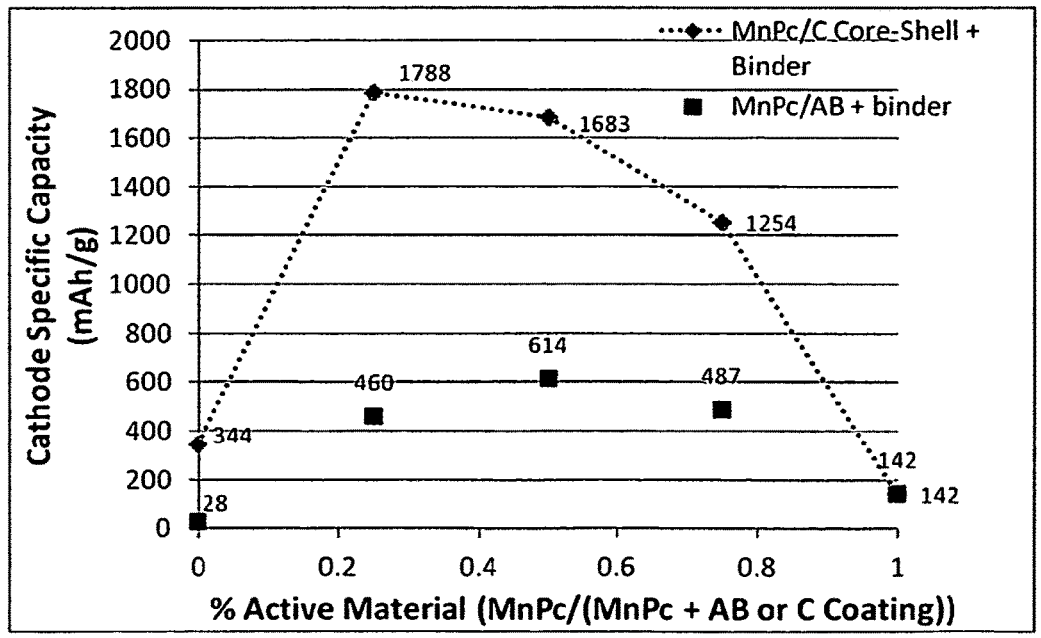
Figure 4:
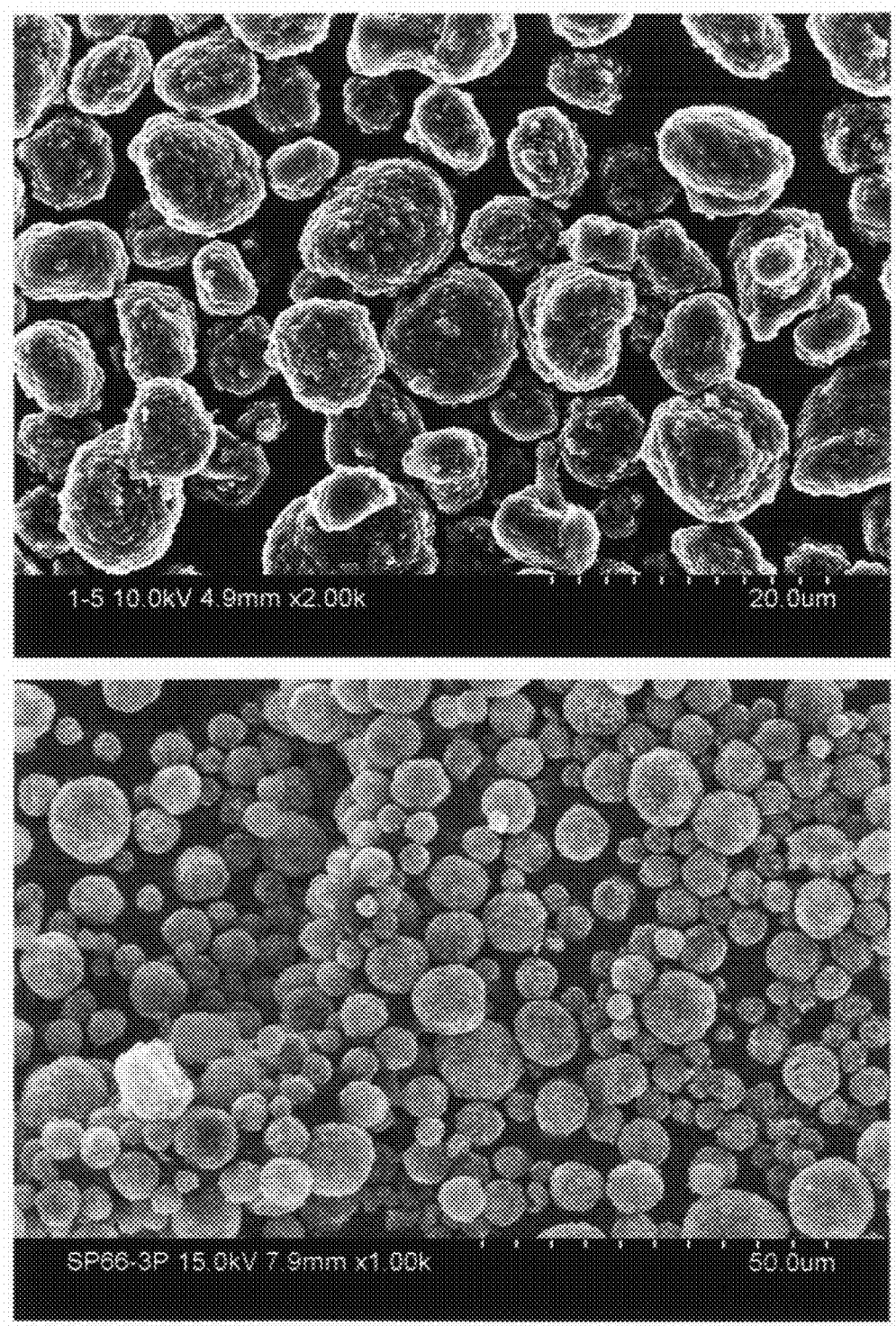
FIG. 4 SEM images of certain encapsulated phthalocyanine particles.

In order to further verify if this synergistic effect occurs in metal naphthalocyanine-graphene combinations, we proceeded to investigate the cathodes based on manganese naphthalocyanine (MnPc)-graphene and other hybrid cathodes as well. The results, summarized in FIG. 3(B), are equally surprising and even more impressive. A cathode specific capacity of 1,788 mAh/g is absolutely unprecedented. It is of significance to point out again that the carbon coating material used in this series of hybrid materials only provides a maximum specific capacity of 344 mAh/g when used alone. Further, the theoretical specific capacity of MnPc is approximately 1,700 mAh/g (based on the MnPc weight alone). The capacity of 1,788 mAh/g could not have been anticipated by any prior art teachings, alone or in combination.

Figure 7:
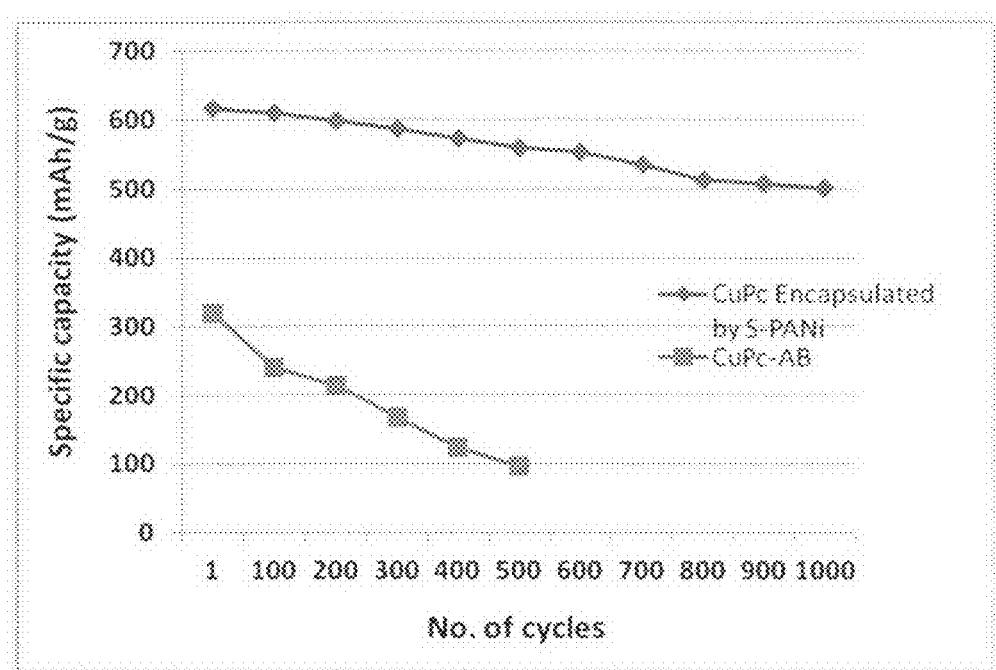
FIG. 7 The specific capacity of this sulfonated polyaniline-encapsulated TSCuPc cathode material, obtained from a coin cell configuration with Li metal as the anode active material and 1 M LiClO4 in propylene carbonate (PC) solution as the electrolyte, is plotted as a function of the charge/discharge cycles. A baseline sample of TSCuPc with 50% by weight of AB as the conductive additive was also tested.

EXAMPLE 8: Preparation and Electrochemical Behavior of Sulfonated Polymer-Encapsulated Metal Phthalocyanine Cathodes A suspension of sulfonated polyaniline dissolved in water was first prepared. To this sulfonated polyaniline solution was added water-soluble tetrasulfonate salt of copper phthalocyanine (TSCuPc). The weight ratio of sulfonated polyaniline to TSCuPc was approximately 1:1. The specific capacity of this sulfonated polyaniline-encapsulated TSCuPc compound cathode material, obtained from a coin cell configuration with Li metal as the anode active material and 1 M LiClO4 in propylene carbonate (PC) solution as the electrolyte, is plotted as a function of the charge/discharge cycles (FIG. 7). A baseline sample of TSCuPc with 50% by weight of AB as the conductive additive was also prepared in a similar manner. The charge/discharge behaviors of this cell were also monitored. The specific capacity data of this cell were also included in FIG. 7. These data have clearly demonstrated that the CuPc-AB composite cathode has a fast capacity decay rate with the specific capacity dropping to an unacceptably low value in less than 100 cycles. In contrast, the graphene-enabled hybrid system exhibits a minimal capacity decay even after 1000 cycles. Clearly, the problems associated with phthalocyanine solubility and its catalytic effect on electrolyte decomposition have been overcome by using the presently invented encapsulation strategy.

EXAMPLE 9: Meso-porous Soft Carbon as an Anode Active Material

Chemically etched or expanded soft carbon was prepared from a liquid crystalline aromatic resin. The resin was ground with a mortar, and calcined at 900° C. for 2 h in a $N_2$ atmosphere to prepare the graphitizable carbon or soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours. The high surface areas are available to capture and store lithium when a cell is recharged. With these surfaces, the re-deposited lithium layer appears to be more stable with respect to the electrolyte as compared to a bare current collector, such as copper foil alone.

EXAMPLE 10: Expanded Activated Carbon (E-AC) as an Anode Active Material

Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulphate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC.

EXAMPLE 11: Chemically Treated Needle Coke as an Anode Active Material

Anisotropic needle coke has a fully developed needle-shape texture of optical anisotropy. Volatile species of the raw coke was estimated to be around 5 wt. %. Activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours.

EXAMPLE 12 Chemically Treated Petroleum Pitch-Derived Hard Carbon as an Anode Active Material A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles.

EXAMPLE 13: Chemically Expanded Meso-phase Carbon as an Anode Active Material Meso-carbon microbeads (MCMBs) were supplied from China Steel Chemical Co. This material has a density of about 2.24 $g/cm^3$ with a median particle size of about 16 μm. The MCMB powder was immersed in $K_2CO_3$ at 900° C. for 1 h. The chemically treated meso-phase carbons showed a BET specific surface area of 1,420 $m^2/g$.

EXAMPLE 14: Graphitic Fibrils from Pitch-Based Carbon Fibers as an Anode Active Material Fifty grams of graphite fibers from Amoco (P-55S) were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a Cowles (a rotating-blade dissolver/disperser) for 10 minutes. The resulting graphitic fibrils were examined using SEM and TEM and their length and diameter were measured.

EXAMPLE 15: Expanded Multi-Walled Carbon Nanotubes (MWCNTs) as an Anode Active Material Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds.

EXAMPLE 16: Prelithiated and Non-Lithiated Nano Cobalt Oxide ($CO_3O_4$) Anodes An appropriate amount of inorganic salts $Co(NO_3)_2.6H_2O$ was added to an ammonia solution ($NH_3.H_2O$, 25 wt %). The resulting precursor suspension was stirred for 4 hours under an argon flow condition to ensure a complete reaction. The resulting $Co(OH)_2$ precursor suspension was filtered and dried under vacuum at 70° C. to obtain a $Co(OH)_2$. This precursor was calcined at 450° C. in air for 2 h to form nano $Co_3O_4$ powder with an average particle size of approximately 34 nm.

The working electrodes (for use as an anode in a lithium-ion cell) were prepared by mixing 85 wt % active material ($Co_3O_4$ powder), 7 wt % acetylene black (Super-P), and 8 wt % polyvinylidene fluoride (PVDF, 5 wt % solid content) binder dissolved in N-methyl-2-pyrrolidinoe (NMP) to form a slurry-like mixture. After coating the slurry on Cu foil, the electrode was dried at 120° C. in vacuum for 2 h to remove the solvent before pressing. The electrode prepared was divided into two pieces: one piece was for use as a non-prelithiated anode and the other piece was prelithiated electrochemically by following the procedure described below:

The second piece of $Co_3O_4$ electrode was immersed in a liquid electrolyte prepared by dissolving 1 M $LiPF_6$ electrolyte solution in a mixture of ethylene carbonate (EC) and diethyl carbonate (DEC) (EC-DEC, 1:1 v/v). A piece of lithium foil was used as a counter-electrode, which was also immersed in the electrolyte. Direct current was used to charge the $Co_3O_4$ electrode until an amount of lithium equivalent to approximately 860 mAh/g based on cobalt oxide weight was inserted into $Co_3O_4$. The prelithiation procedure was performed in an argon-filled glove-box.

Subsequently, the lithiated and non-lithiated electrodes were separately cut into disks (diameter=12 mm) for use as an anode. In the cell containing a non-lithiated $Co_3O_4$ anode, a thin sheet of lithium foil (as a lithium source) was attached to the anode surface and a piece of porous separator was, in turn, stacked on top of the lithium foil. Pieces of electrodes prepared from the iron phthalocyanine (FePc)-Carbon core-shell structures of Example 2 and coated on an aluminum foil (cathode current collector) were used as a cathode to form a CR2032 coin-type cell. Celgard 2400 membrane was used as separator, and 1 M $LiPF_6$ electrolyte solution dissolved in a mixture of ethylene carbonate (EC) and diethyl carbonate (DEC) (EC-DEC, 1:1 v/v) was used as cell electrolyte. The cell assembly was performed in an argon-filled glove-box. The CV measurements were carried out using a CHI-6 electrochemical workstation at a scanning rate of 1 mV/s.

COMPARATIVE EXAMPLE 16: Li-Ion Cells Containing a Prelithiated or Non-lithiated Cobalt Nano Oxide ($Co_3O_4$) Anode and a Lithium Iron Phosphate Cathode Lithium iron phosphate $LiFePO_4$ is a promising candidate cathode material in lithium-ion batteries for electric vehicle applications. The advantages of $LiFePO_4$ as a cathode active material includes a relatively high theoretical capacity (170 mAh/g), environmental benignity, low resource cost, good cycling stability, high temperature capability, and prospect for a safer cell compared with $LiCoO_2$. For comparison purposes, we have also prepared similar Li-ion cells containing $LiFePO_4$ as the cathode active material.

The electrochemical performance of the prelithiated $Co_3O_4$ anode/FePc-C Core-Shell, non-lithiated $Co_3O_4$/Li source/FePc-C Core-Shell cell, lithiated $Co_3O_4$/$LiFePO_4$ cell, and non-lithiated $Co_3O_4$/$LiFePO_4$ cell was also evaluated by galvanostatic charge/discharge cycling at a current density of 50 mA/g, using a LAND electrochemical workstation.

Figure 5:
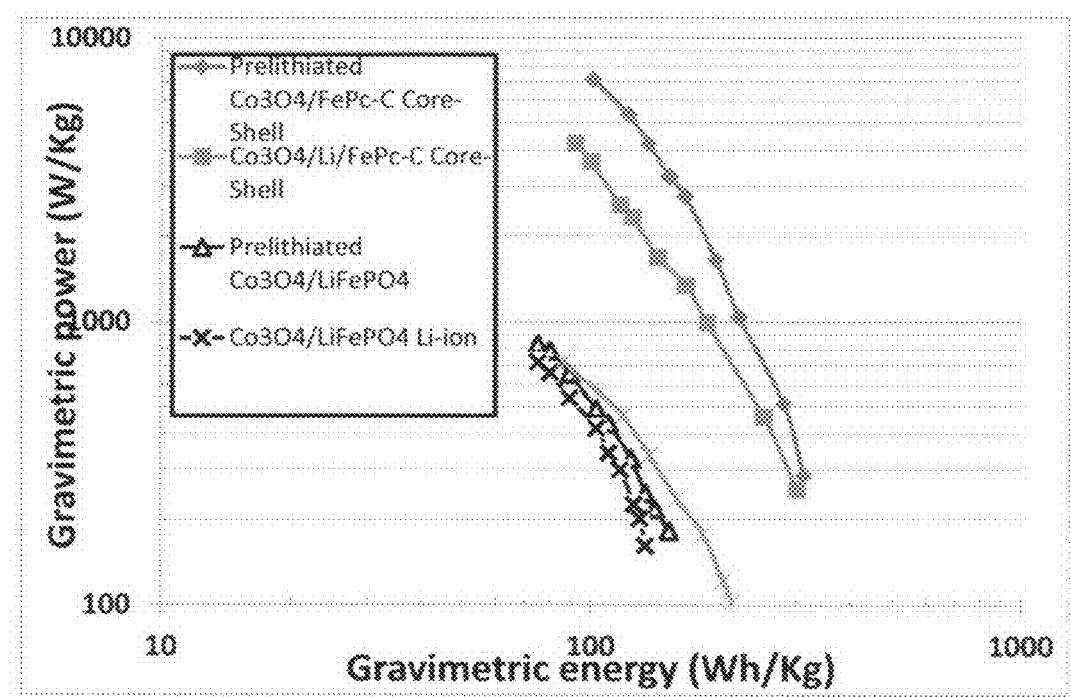
FIG. 5 Ragone plot of five types of electrochemical cells: (i) a Li-ion cell using FePc-C core shell as a cathode active material, a $Co_3O_4$ anode active material, and a Li foil as a lithium ion source; (ii) another lithium-ion cell using FePc-C core shell as a cathode active material and a prelithiated $Co_3O_4$ anode active material; (iii) a prior art Li-ion cell using prelithiated $Co_3O_4$ as the anode active material and $LiFePO_4$ as the cathode active material; (iv) another prior art Li-ion cell using non-prelithiated $Co_3O_4$ as the anode active material and $LiFePO_4$ as the cathode active material; and (v) a prior art lithium metal cell using Li metal foil as the anode active material and FePc-AB as the cathode active material (50% FePc and 50% AB).

The Ragone plots of five types of electrochemical cells are presented in FIG. 5. These data have demonstrated that the presently invented Li-ion cells using FePc-C core-shell particles as a cathode active material exhibit exceptional energy density and relatively good power density. Both of the new cells (one having a non-lithiated $Co_3O_4$ anode active material and Li foil as a lithium ion source and the other having a prelithiated $Co_3O_4$ anode active material) have an energy density higher than 300 Wh/kg, which is significantly greater than the typical 120-150 Wh/kg of prior art lithium-ion cells. Most surprisingly, these cells can also deliver a power density that is 10 times higher than those of prior art Li-ion cells (typically<0.5 kW/kg). The power density of the new cell reaches 7.13 kW/kg, which has never been achieved with any prior art lithium-ion cells. The implementation of a hybrid FePc-C core-shell material as a cathode active material has made it possible to achieve both high energy density and high power density.

As a point of reference, the typical power density of symmetric supercapacitors (noted for their superior power density) is 3-6 kW/kg; but their energy density is 5-8 Wh/kg. The presently invented Li-ion cells have achieved both high energy density and high power density that cannot be achieved with current supercapacitors or lithium-ion batteries.

For comparison purposes, the Ragone plot of a Li-ion cell containing a prelithiated $Co_3O_4$ anode and a composite cathode made of FePc (50% by weight) and acetylene black (50% AB) is also included in FIG. 5. Clearly, this very best member of the series of FePc-AB based cells does not even come close to the FePc-graphene based cells in terms of both energy density and power density (rate capability).

EXAMPLE 17: Li-ion Cells Having a Prelithiated Tin Oxide Anode and a NiPc-C Core-Shell Cathode Tin oxide ($SnO_2$) nano particles were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 min. To this solution, few drops of 0.1M of $H_2SO_4$ were added to flocculate the product. The precipitated solid was collected by centrifugation, washed with water and ethanol, and dried in vacuum. The dried product was heat-treated at 400° C. for 2 h under Ar atmosphere.

The battery cells from the $SnO_2$ particles (having acetylene black particles as a conductive filler) was prepared using a procedure described in Example 16. The tin oxide was electrochemically prelithiated up to a specific capacity of approximately 1,200 mAh/g. The testing methods were also similar to those used in Example 16.

COMPARATIVE EXAMPLE 17B: Prelithiated Tin Oxide as the Anode Active Material and Ball-milled NiPc-AB Composite as the Cathode Active Material in a Conventional Li-Ion Cell For comparison purposes, we have also prepared a corresponding lithium-ion cell containing prelithiated tin oxide as the anode active material and ball-milled NiPc-AB as the cathode active material.

Figure 6:
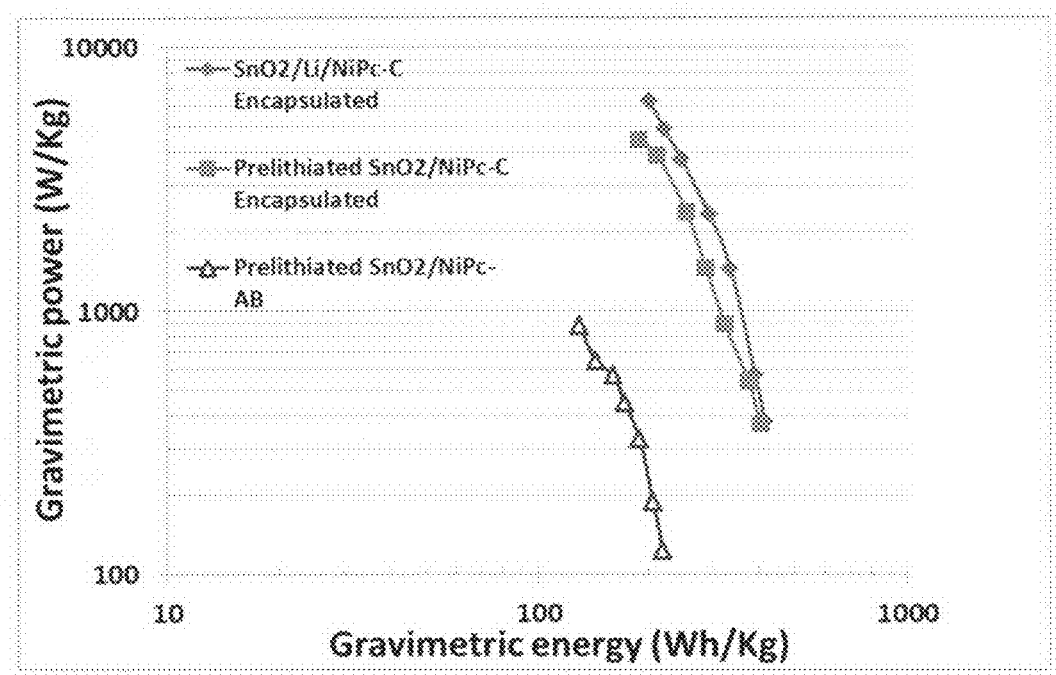
FIG. 6 Ragone plot of three types of electrochemical cells: (i) a Li-ion cell using C-encapsulated NiPc as a cathode active material, $SnO_2$ as an anode active material, and Li foil as a lithium ion source; (ii) another lithium-ion cell using C-encapsulated NiPc as a cathode active material and prelithiated $SnO_2$ as an anode active material; and (iii) a Li-ion cell using prelithiated $SnO_2$ as the anode active material and NiPc-AB as a cathode active material.

Presented in FIG. 6 are the Ragone plots of three types of electrochemical cells. Two of the cells represent two examples of the presently invented NiPc-C core-shell cathode-based Li-ion cells: one containing non-lithiated $SnO_2$ nano particles as an anode active material and Li foil as a lithium ion source and the other containing prelithiated $SnO_2$ micron particles as an anode active material. In both cases, the $SnO_2$ particles were bonded to the anode current collector with a resin binder, along with a conductive additive. These two cells exhibit an exceptionally high energy density (>400 Wh/kg), which is significantly greater than those of corresponding Li-ion cell (using prelithiated $SnO_2$ as the anode active material and NiPc-AB as a cathode active material). There has been no cathode material thus far reported that could enable a lithium-ion cell containing an anode to exhibit an energy density higher than 300 Wh/kg. This is clearly a very impressive and unexpected result.

EXAMPLE 18: Prelithiated Si Nanowires as an Anode Active Material and PEG-Encapsulated MnPc as a Cathode Active Material In a typical procedure for preparing Si nanowires, approximately 2.112 g of silicon powders (average diameter 2.64 μm) were mixed with 80 ml of a 0.1M aqueous solution of $Ni(NO_3)_2 \cdot 6H_2O$ and vigorously stirred for 30 min. Then, water was evaporated in a rotary evaporator and the solid remnants were completely dried in an oven at 150° C. The final sample (Ni-impregnated Si powers) was obtained by grinding the solids in a mortar.

Subsequently, 0.03 g of Ni-impregnated Si particles was placed in a quartz boat, and the boat was placed in a tube furnace. The sample was reduced at 500° C. for 4 hours under flowing Ar (180 sccm) and $H_2$ (20 sccm); then the temperature was raised to 990° C. to synthesize Si nanowires. For the purpose of separating Si nanowires, for instance, every 0.1 g of the reacted Si powders was mixed with 10 ml of ethanol and the resulting mixture was sonicated for 1 hour. Subsequently, Si nanowires were separated from the Si powders by centrifuging at 5,000 rpm for 10 min.

Si nanowires were mixed with acetylene black particles to prepare anodes. The electrodes made were lithiated by using a procedure similar to that described in Example 16. Coin cells were similarly made using PEG-MnPc as the cathode active material, but three types of materials separately as the anode active material: (i) prelithiated Si nanowires, (ii) Li metal foil alone, and (iii) expanded MWCNTs with Li metal foil.

Coin cells using PEG-MnPc as a cathode active material (+10% PVDF as a resin binder) and the three anode active materials were made and tested. In all cells, the separator used was one sheet of micro-porous membrane (Celgard 2500). The current collector for the cathode was a piece of carbon-coated aluminum foil and that for the anode was Cu foil. The electrolyte solution was 1 M $LiPF_6$ dissolved in a mixture of ethylene carbonate (EC) and dimethyl carbonate (DMC) with a 3:7 volume ratio. The separator was wetted by a small amount of electrolyte to reduce the background current. Cyclic voltammetry and galvanostatic measurements of the lithium cells were conducted using an Arbin 32-channel supercapacitor-battery tester at room temperature (in some cases, at a temperature as low as −40° C. and as high as 60° C.).

Figure 8:
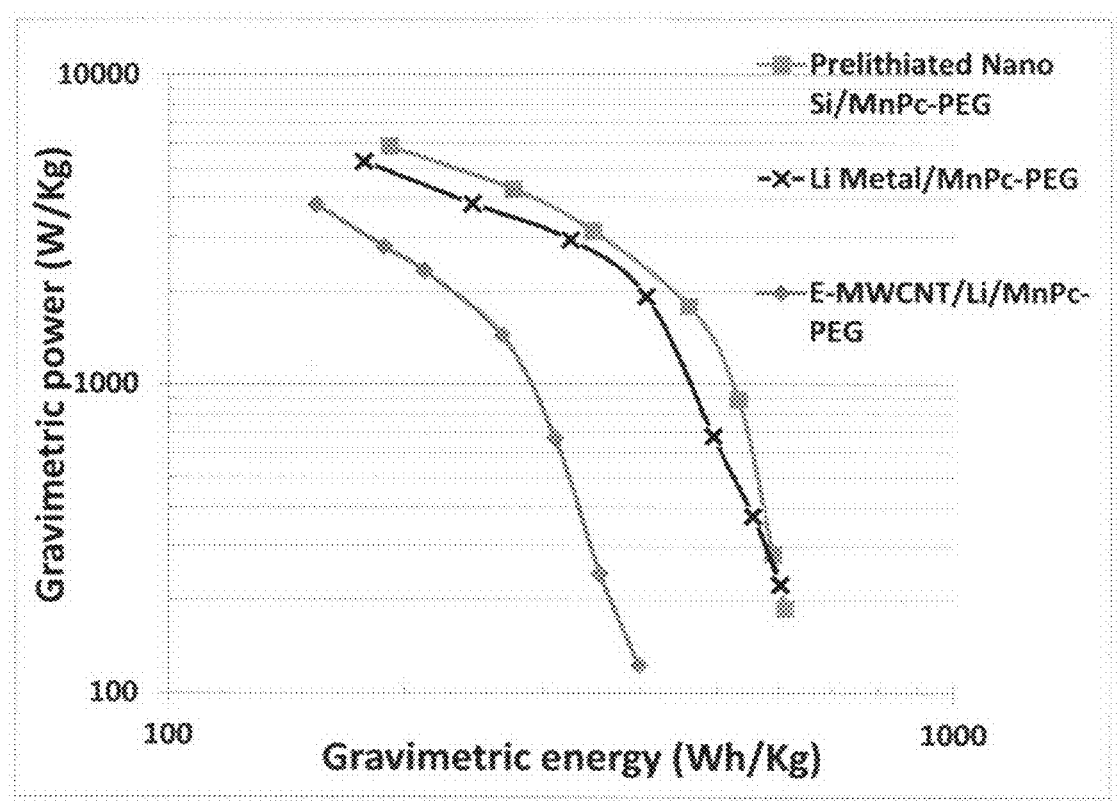
FIG. 8 Ragone plot of three types of electrochemical cells: all using PEG-encapsulated MnPc as the cathode active material, but with three types of anode active material: (i) prelithiated Si nanowires, (ii) Li metal foil alone, and (iii) expanded MWCNTs with Li metal foil.

The Ragone plots of the three types of electrochemical cells are shown in FIG. 8. Two of the PEG-MnPc cathode-based Li cells of the present invention are capable of delivering a cell-level energy density greater than 600 Wh/kg, an unprecedented value of all lithium-ion cells ever reported. The third one can store up to 400 Wh/g, a very impressive value as well. These cells are also capable of delivering a power density of 3-6 kW/kg, comparable to those of the best symmetric supercapacitors. The anode containing only the Li foil appear to deliver the best power density; however, the cycling stability of this cell is not as good as the other two cells that contain an intercalation compound as an anode active material.

Figure 9:
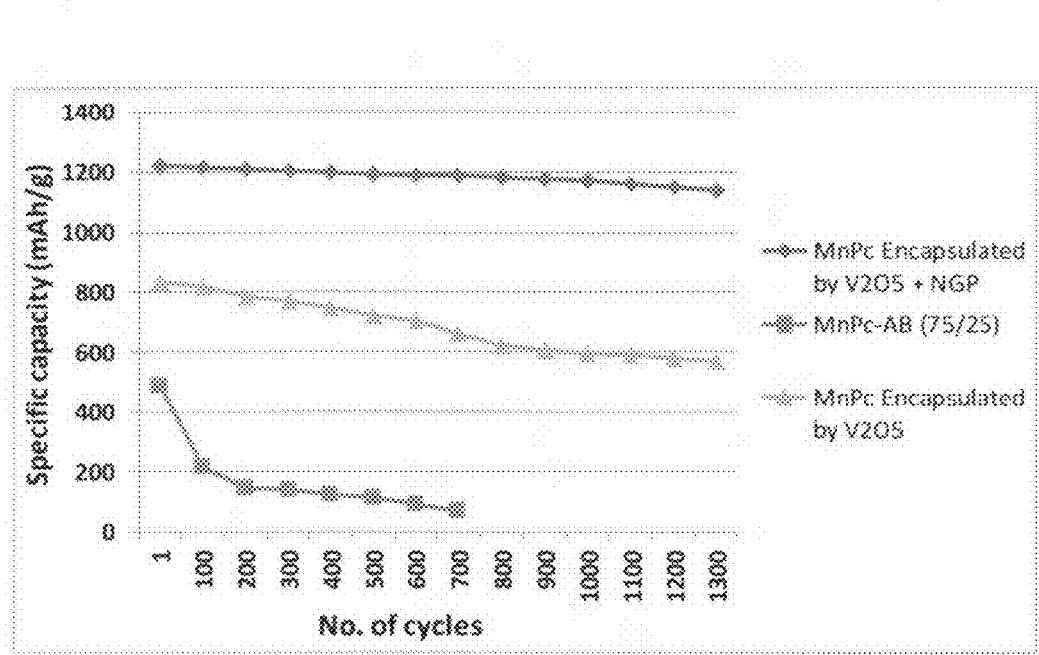
FIG. 9 The specific capacity of un-encapsulated Mn phthalocyanine compound particles (with AB as a conductive additive), $V_2O_5$-protected Mn phthalocyanine compound particles, and $V_2O_5$-protected Mn phthalocyanine compound particles further wrapped around by graphene sheets.

EXAMPLE 19: Lithium Foil as an Anode Active Material and $V_2O_5$-Encapsulated Mn Phthalocyanine Compound Particles (with or without Graphene Wrapping) as a Cathode Active Material The electrochemical performance of $V_2O_5$-protected Mn phthalocyanine compound particles and graphene-wrapped, $V_2O_5$-protected Mn phthalocyanine compound particles, prepared in Example 5, was evaluated and compared with that of Mn phthalocyanine compound particles (mixed with AB particles as a conductive additive). The discharge capacity values of these three cells conducted at a 0.1 C rate were plotted in FIG. 9 as a function of the number of charge/discharge cycles. Several interesting observations can be made from these data: (1) Encapsulation of phthalocyanine compound particles by a lithium-conducting material helps to bring out additional lithium storing capability of the phthalocyanine compound; (2) Such an encapsulation strategy also significantly improves the cycling stability of the lithium cell; (3) Further wrapping of the $V_2O_5$-protected Mn phthalocyanine compound particles helps to bring out the best lithium storing capability of the phthalocyanine compound and further improves the cycling stability. This has completely eliminated the dissolution of the phthalocyanine compound in liquid electrolyte and the detrimental decomposition of electrolyte catalyzed by the transition metal phthalocyanine compound. The cell experiences a capacity decay of less than 6.7% even after 1300 charge/discharge cycles. In contrast, the un-protected phthalocyanine compound has suffered a 55% capacity loss after only 100 cycles.

Figure 10:
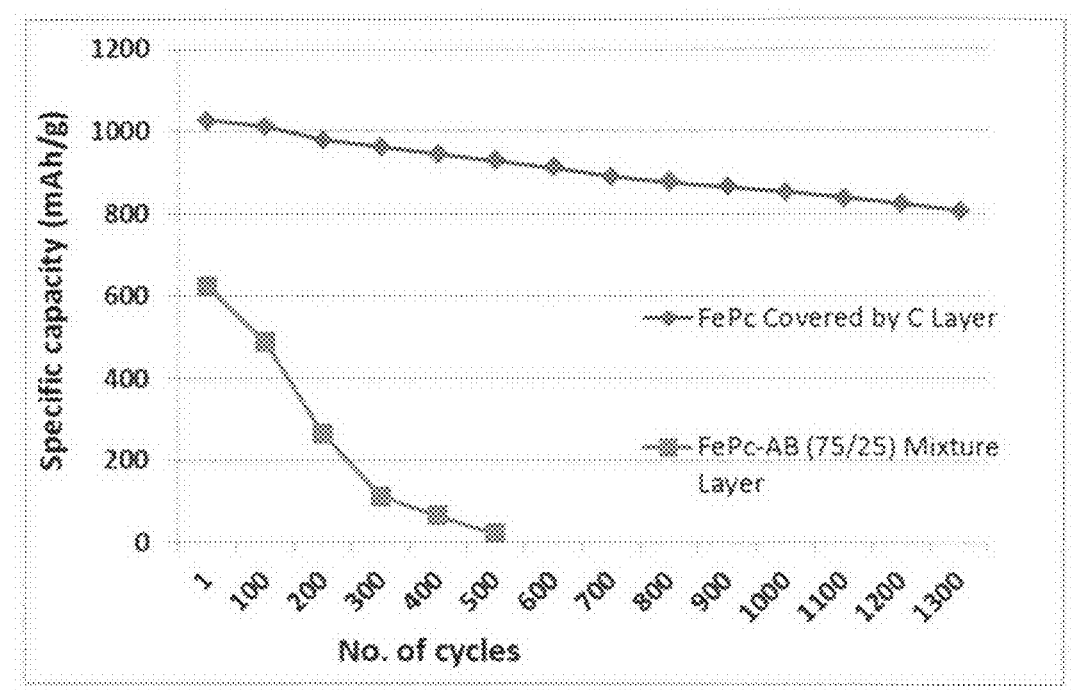
FIG. 10 The specific capacity of an un-protected FePc-AB layer and that of a C layer-protected FePc layer as the cathode active material in a lithium metal cell.

EXAMPLE 20: Lithium Foil as an Anode Active Material and Sputtering Carbon Layer as a Protective Material Layer for a Fe Phthalocyanine Layer Two cathode configurations were investigated. One is composed of a layer of FePc-AB composite that is deposited onto an aluminum foil current collector. The thickness is approximately 54 μm. The other is composed of a layer of FePc (without AB) approximately 56 μm thick, which is coated with a layer of amorphous carbon approximately 89 nm thick. This carbon layer was formed by casting a layer of malic acid onto a layer of FePc pre-coated on an aluminum foil current collector. The malic acid layer was then carbonized at a temperature of approximately 185° C. for 6 hours. This malic casting and carbonization treatment was repeated to further densify the protective layer. These cathode structures were then cut and assembled into coin cells for electrochemical studies. The electrolyte solution was 1 M $LiPF_6$ dissolved in a mixture of ethylene carbonate (EC) and dimethyl carbonate (DMC) with a 3:7 volume ratio. The charge-discharge cycling data, summarized in FIG. 10, have demonstrated that a discrete protective material layer, isolating a phthalocyanine compound layer from liquid electrolyte, is very effective in preventing dissolution of phthalocyanine compound in electrolyte and helping to maintain a high cathode specific capacity over a large number of cycles. In contrast, an un-protected phthalocyanine compound layer results in a rapid capacity fade.

In summary, after extensive and in-depth studies, we have developed a new rechargeable lithium battery technology based on new electrochemistry and distinct material composition strategies:

(1) We have discovered that a broad array of phthalocyanine compounds, in combination with an encapsulating material, can be used as a cathode active material of a rechargeable lithium cell (lithium metal secondary cell or lithium-ion cell). We have further observed that these encapsulated phthalocyanine materials can exhibit a specific capacity significantly higher than 1,000 mAh/g and, in several samples, the capacity has exceeded 1,700 mAh/g. This has been most surprising and has not been reported or predicted by those who work in the battery industry or the field of electrochemistry. All the commonly used cathode active materials for lithium-ion cells have a practical specific capacity lower than 250 mAh/g (mostly lower than 200 mAh/g).

(2) The implementation of an encapsulated phthalocyanine-based cathode in a rechargeable lithium cell has led to an unprecedentedly high energy density that is typically greater than 300 Wh/kg (based on the total cell weight), often greater than 400 Wh/kg, and even greater than 600 Wh/kg in several cases. This cell can be charged and discharged for thousands of cycles with very little capacity fade. It is no exaggeration to state that this is truly a major breakthrough in lithium battery industry.

(3) By encapsulating phthalocyanine compound particles with a protective material (e.g. preferably in a core-shell form), we have overcome several longstanding and challenging technical issues that have thus far impeded the commercialization of lithium secondary battery having a phthalocyanine compound-based cathode:

a. These cathode active materials are electrically insulating and, hence, require the use of a large amount of conductive additives (e.g. carbon black, CB, or acetylene black, AB) that are electrochemically inactive materials (not contributing to lithium storage, yet adding extra weights to the cell). Typically, up to >50% by weight of inactive materials has to be added. In contrast, a wide range of encapsulating material weight fractions, small or large, can be used and, in all proportions except for the case of <0.1% of graphene, the improvement has been dramatic and synergistic.

b. The prior art lithium metal cells having a phthalocyanine cathode exhibit very poor rate capability. In other words, their lithium storing capacity drops significantly when a higher charge/discharge rate or higher current density is imposed on the cell. However, the co-existence of both a phthalocyanine compound and an encapsulating material unexpectedly led to an exceptional cathode specific capacity and cell energy density that cannot be achieved by either component alone.

c. The prior art cells having a phthalocyanine cathode are not very reversible, typically having very poor cycling stability and a short cycle life. One reason responsible for this poor cycle stability is likely due to the notion that most of these cathode active materials are soluble in the liquid electrolyte, gradually losing the amount of cathode active material available for lithium storage. The presence of an encapsulating material appears to have alleviated and, in most cases, eliminated this problem.

d. All the metal phthalocyanine compounds (MPc) have a catalytic effect on the decomposition of electrolytes, creating cycle irreversibility and long-term instability. The presence of an encapsulating material appears to have alleviated or even eliminated these problems as well. Where graphene sheets are added to further embrace and wrap around the encapsulated metal phthalocyanine crystals and protect these crystals from being in direct chemical interaction with electrolyte, there has been no catalytic decomposition of electrolyte observed.

We claim:

1. A cathode material for use in a rechargeable lithium cell, said cathode material comprising a phthalocyanine compound particle encapsulated by a protective material to form a core-shell structure wherein said core comprises said phthalocyanine compound and said shell comprises said protective material, wherein said phthalocyanine compound is in an amount of from 1% to 99% by weight based on the total weight of the phthalocyanine compound and the protective material combined and said protective material is selected from:

a. a combination of an intrinsically conductive polymer and a sulfonated polymer;
 b. sulfonated polypyrrole, sulfonated polythiophene, sulfonated polyfuran, sulfonated bi-cyclic polymer, a derivative thereof, or a combination thereof;
 c. a combination of a metal oxide with a pitch or a combination of a lithium metal oxide with a pitch; or
 d. an aliphatic polyester.

2. The cathode material of claim 1, wherein said phthalocyanine compound is selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, or a combination thereof.

3. The cathode material of claim 1, wherein said protective material contains a material selected from the group consisting of poly(perfluoro sulfonic acid), sulfonated poly (tetrafluoroethylene), sulfonated perfluoroalkoxy derivatives of polytetrafluoroethylene, sulfonated polysulfone, sulfonated poly(ether ketone), sulfonated poly (ether ether ketone), sulfonated polyimide, sulfonated styrene-butadiene copolymers, sulfonated poly chloro-trifluoroethylene (PCTFE), sulfonated perfluoroethylene-propylene copolymer (FEP), sulfonated ethylene-chlorotrifluoroethylene copolymer (ECTFE), sulfonated poly vinylidenefluoride (PVDF), sulfonated copolymers of polyvinylidenefluoride with hexafluoropropene and tetrafluoroethylene, sulfonated copolymers of ethylene and tetrafluoroethylene (ETFE), polybenzimidazole (PBI), their chemical derivatives, copolymers, blends, and combinations thereof.

4. The cathode material of claim 1, wherein said phthalocyanine compound is in an amount of from 10% to 90% by weight based on the total weight of the phthalocyanine compound and the protective material combined.

5. The cathode material of claim 1, wherein said encapsulated phthalocyanine compound is further wrapped around or embraced by a graphene material.

6. The cathode material of claim 5, wherein said graphene material is selected from a single-layer sheet or multi-layer platelet of graphene, graphene oxide, fluorinated graphene, halogenated graphene, hydrogenated graphene, nitrogenated graphene, pristine graphene, doped graphene, boron doped graphene, nitrogen doped graphene, chemically treated graphene, reduced graphene oxide, functionalized graphene, functionalized graphene oxide, or a combination thereof.

7. The cathode material of claim 1, wherein said phthalocyanine compound is in a nanoparticle, nano-fiber, or nano-wire form having a dimension smaller than 100 nm.

8. The cathode material of claim 1, wherein said core has a size no greater than 1 µm and said shell has a thickness no greater than 100 nm.

9. The cathode material of claim 1, wherein said core has a size no greater than 100 nm and said shell has a thickness no greater than 20 nm.

10. A rechargeable lithium cell comprising:
(A) an anode comprising an anode active material, wherein said anode active material is a prelithiated lithium storage material or a combination of a lithium storage material and a lithium ion source selected from lithium metal, lithium alloy, or lithium-containing compound, wherein said lithium storage material is selected from: (a) silicon (Si), germanium (Ge), lead (Pb), antimony (Sb), bismuth (Bi), titanium (Ti), cobalt (Co), nickel (Ni), manganese (Mn), cadmium (Cd), or a mixture thereof; (b) alloy or intermetallic compound of Si, Ge, Pb, Sb, Bi, Ti, Fe, Co, Ni, Mn, Cd, or a mixture thereof; (c) oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) salt or hydroxide of Sn; (e) prelithiated version thereof, or (f) a carbon or graphite material;
(B) a cathode comprising an encapsulated phthalocyanine compound electrode material of claim 1 as a cathode active material; and
(C) an electrolyte or an electrolyte and a porous separator disposed between said anode and said cathode and said electrolyte is in ionic contact with said anode and said cathode.

11. The rechargeable lithium cell of claim 10 wherein said prelithiated lithium storage material contains a mixture of a high capacity anode material and a high rate capable anode material, wherein said high rate capable anode material is selected from nano-scaled particles or filaments of a lithium transition metal oxide, lithiated $Co_3O_4$, lithiated $Mn_3O_4$, lithiated $Fe_3O_4$, $Li_4Ti_5O_{12}$, or a combination thereof, and said high capacity anode material is selected from pre-lithiated Si, Ge, Sn, SnO, or a combination thereof.

12. The rechargeable lithium cell of claim 10, wherein said prelithiated lithium storage material has a specific capacity of no less than 500 mAh/g based on the anode active material weight.

13. The rechargeable lithium cell of claim 10, wherein said prelithiated lithium storage material has a specific capacity of no less than 1000 mAh/g based on the anode active material weight.

14. The rechargeable lithium cell of claim 10, wherein said prelithiated lithium storage material has a specific capacity of no less than 2,000 mAh/g based on the anode active material weight.

15. The rechargeable lithium cell of claim 10, wherein the electrolyte contains an organic liquid electrolyte, ionic liquid electrolyte, gel electrolyte, polymer electrolyte, solid electrolyte, or a combination thereof.

16. The rechargeable lithium cell of claim 10, wherein the electrolyte contains an organic liquid electrolyte, ionic liquid electrolyte, gel electrolyte, polymer electrolyte, solid electrolyte, or a combination thereof, and wherein the electrolyte contains lithium ions.

17. A lithium cell comprising:
(a) an anode comprising an anode current collector and a lithium ion source selected from lithium metal, a lithium alloy, or lithium-containing compound, wherein said lithium alloy or lithium-containing compound is selected from: (a) a pre-lithiated silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), or a mixture thereof; (b) a pre-lithiated alloy or intermetallic compound of Si, Ge, Sn, Pb, Sb, Bi, Zn, Al, Ti, Fe, Co, Ni, Mn, Cd, or a mixture thereof; (c) a pre-lithiated oxide, carbide, nitride, sulfide, phosphide, selenide, telluride, or antimonide of Si, Ge, Sn, Pb, Sb, Bi, Zn, Al, Fe, Ti, Co, Ni, Mn, Cd, or a mixture or composite thereof, (d) a pre-lithiated salt or hydroxide of Sn; or (e) a pre-lithiated carbon or graphite material;
(b) a cathode comprising an encapsulated phthalocyanine compound of claim 1, wherein said phthalocyanine compound is selected from metal-free phthalocyanine, copper phthalocyanine, zinc phthalocyanine, tin phthalocyanine, lead phthalocyanine, iron phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, or a combination thereof; and
(c) electrolyte in ionic contact with said anode and said cathode.

18. A lithium cell comprising:
(a) an anode comprising an anode active material, wherein said anode active material is a prelithiated lithium storage material or a combination of a lithium storage material and a lithium ion source selected from lithium metal, lithium alloy, or lithium-containing compound, wherein said lithium storage material is selected from graphite worms, exfoliated graphite flakes, expanded graphite, chemically treated graphite with an inter-graphene planar separation no less than 0.4 nm, chemically etched or expanded soft carbon, chemically etched or expanded hard carbon, exfoliated activated carbon, chemically etched or expanded carbon black, chemically expanded multi-walled carbon nano-tube, chemically expanded carbon nano-fiber, or a combination thereof, wherein this lithium storage material has surface areas to capture and store lithium thereon and has a specific surface area greater than 50 m$^2$/g in direct contact with said electrolyte;
(b) a cathode comprising a phthalocyanine compound protected by a protective material in such a manner that the phthalocyanine compound is not in direct contact with an electrolyte, wherein said phthalocyanine compound forms a layer having two opposing surfaces wherein one surface is connected to a current collector and the other surface is covered by a layer of said protective material, wherein said protective material is selected from:
a. a combination of an intrinsically conductive polymer and a sulfonated polymer;
b. sulfonated polypyrrole, sulfonated polythiophene, sulfonated polyfuran, sulfonated bi-cyclic polymer, a derivative thereof, or a combination thereof;
c. a combination of a metal oxide with a pitch or a combination of a lithium metal oxide with a pitch; or
d. an aliphatic polyester; and
(c) an electrolyte or combined electrolyte-porous separator disposed between said anode and said cathode.

* * * * *